US012249111B2

(12) United States Patent
Tsubota

(10) Patent No.: US 12,249,111 B2
(45) Date of Patent: Mar. 11, 2025

(54) INFORMATION PROCESSING APPARATUS, INFORMATION PROCESSING METHOD, AND INFORMATION PROCESSING PROGRAM

(71) Applicant: FUJIFILM CORPORATION, Tokyo (JP)

(72) Inventor: Keiji Tsubota, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 504 days.

(21) Appl. No.: 17/580,667

(22) Filed: Jan. 21, 2022

(65) Prior Publication Data

US 2022/0245925 A1     Aug. 4, 2022

(30) Foreign Application Priority Data

Jan. 29, 2021 (JP) ................................. 2021-013739

(51) Int. Cl.
G06V 10/70 (2022.01)
G06T 7/00 (2017.01)
G06V 10/25 (2022.01)

(52) U.S. Cl.
CPC ............ G06V 10/70 (2022.01); G06T 7/0012 (2013.01); G06V 10/25 (2022.01); G06T 2207/20081 (2013.01); G06T 2207/30004 (2013.01); G06V 2201/03 (2022.01)

(58) Field of Classification Search
CPC .... G06V 10/70; G06V 10/25; G06V 2201/03; G06T 7/0012; G06T 2207/20081; G06T 2207/30004

USPC ........................................................ 382/128
See application file for complete search history.

(56) References Cited

U.S. PATENT DOCUMENTS

| 2019/0251723 | A1* | 8/2019 | Coppersmith, III | ... G06N 3/045 |
| 2019/0318260 | A1 | 10/2019 | Yasutomi et al. | |
| 2021/0270722 | A1* | 9/2021 | Chou | ...................... G16H 30/40 |
| 2021/0295523 | A1 | 9/2021 | Yamazaki et al. | |
| 2023/0005251 | A1* | 1/2023 | Take | ...................... G06V 10/82 |

FOREIGN PATENT DOCUMENTS

| JP | 2009-265082 A | 11/2009 |
| JP | 2019-185483 A | 10/2019 |
| JP | 2020-14799 A | 1/2020 |
| JP | 2020-032043 A | 3/2020 |

(Continued)

OTHER PUBLICATIONS

Emma Beede et al., "A Human-Centered Evaluation of a Deep Learning System Deployed in Clinics for the Detection of Diabetic Retinopathy", CHI 2020 Paper 589, Apr. 2020, USA.

(Continued)

*Primary Examiner* — Michael R Neff
(74) *Attorney, Agent, or Firm* — SOLARIS Intellectual Property Group, PLLC

(57) ABSTRACT

An information processing apparatus including at least one processor, wherein the processor is configured to cause a learning model that is used to extract a region of interest from an input image, to perform learning in response to an input of a pseudo image generated in a case where a pixel value of at least a part of an original image obtained by imaging a subject is changed, as data for learning.

17 Claims, 14 Drawing Sheets

(56) References Cited

FOREIGN PATENT DOCUMENTS

| | | |
|---|---|---|
| JP | 2020-109614 A | 7/2020 |
| JP | 2020-197844 A | 12/2020 |

OTHER PUBLICATIONS

Muramatsu Kyouhei et al., "An effective learning of the shape identification DNN, 3 dimensional point grouping, and mixup extension", SSID 2012 [USBN 19], Nihon Co., Ltd., and image sensing Technology, University of Yamanashi.

English language translation of the following: Office action dated Jul. 9, 2024 from the JPO in a Japanese patent application No. 2021-013739 corresponding to the instant patent application. This office action translation is submitted now in order to supplement the understanding of the cited references which are being disclosed in the instant Information Disclosure Statement.

English language translation of the following: Office action dated Jan. 7, 2025 from the JPO in a Japanese patent application No. 2021-013739 corresponding to the instant patent application. This office action translation is submitted now in order to supplement the understanding of the cited references which are being disclosed in the instant Information Disclosure Statement.

* cited by examiner

INFORMATION PROCESSING APPARATUS, INFORMATION PROCESSING METHOD, AND INFORMATION PROCESSING PROGRAM

CROSS-REFERENCE TO RELATED APPLICATIONS

The present application claims priority under 35 U.S.C. § 119 to Japanese Patent Application No. 2021-013739, filed on Jan. 29, 2021. The above application is hereby expressly incorporated by reference, in its entirety, into the present application.

BACKGROUND

Technical Field

The present disclosure relates to an information processing apparatus, an information processing method, and an information processing program.

Related Art

Conventionally, a doctor has generally made a diagnosis on the basis of a medical image acquired by an image acquisition apparatus, such as a computed tomography (CT) apparatus and a magnetic resonance imaging (MRI) apparatus. Further, technology (so-called computer aided detection/diagnosis (CAD)) in which a computer assists in detecting and diagnosing a structure, such as an abnormal shadow and a tissue, included in the medical image has also been known. For example, JP2020-032043A describes that a medical image is analyzed by using a discriminator of which learning has been performed by machine learning and the type of tissue or lesion included in the medical image, that is, the type of observation is specified.

Further, for example, "A Human-Centered Evaluation of a Deep Learning System Deployed in Clinics for the Detection of Diabetic Retinopathy", Emma Beede et al., In CHI, 2020, Paper 589 describes that CAD is not performed in a case where at least a part of a medical image is unclear, in order to avoid non-detection and misdiagnosis of an abnormal shadow. The unclear medical image may be acquired, for example, in a case where imaging is not performed in an appropriate environment or a photographer has a poor imaging technique.

Incidentally, for example, in medical institutions and the like in emerging countries, it may be difficult to acquire a clear medical image because an appropriate environment for capturing a medical image cannot be created or a photographer has a poor imaging technique. Therefore, in recent years, there has been a demand for technology capable of utilizing even an image that is unclear, that is, unsuitable for extraction of a region of interest which may include a structure, such as an abnormal shadow and a tissue, for diagnosis.

SUMMARY

The present disclosure provides an information processing apparatus, an information processing method, and an information processing program by which even an image that is unsuitable for extraction of a region of interest can be utilized for diagnosis.

According to a first aspect of the present disclosure, there is provided an information processing apparatus including at least one processor, in which the processor causes a learning model that is used to extract a region of interest from an input image, to perform learning in response to an input of a pseudo image generated in a case where a pixel value of at least a part of an original image obtained by imaging a subject is changed, as data for learning.

In the first aspect, the processor may cause the learning model, to perform learning in response to an input of a pair of the pseudo image and information indicating a region of interest included in the pseudo image, as the data for learning.

In the first aspect, the processor may cause the learning model, to perform re-learning in response to a re-input of the pseudo image as the data for learning in a case where the learning model fails to extract a region of interest from the input pseudo image.

In the first aspect, the processor may cause the learning model, to perform re-learning in response to a re-input of a pair of the pseudo image and information indicating the region of interest included in the pseudo image, as the data for learning, in a case where the learning model fails to extract the region of interest from the input pseudo image.

In the first aspect, the pseudo image may be an image generated in a case where a pixel value is changed so that an image quality is degraded, in at least a part in the original image.

In the first aspect, the pseudo image may be an image generated in a case where a pixel value of at least a part of the original image is changed while existence or nonexistence of a structure included in the original image is maintained.

In the first aspect, the pseudo image may be an image generated in a case where a pixel value of a region including at least a region of interest in the original image is changed.

In the first aspect, the processor may cause the learning model, to perform learning in response to an input of plural the pseudo images generated in a case where a pixel value in each of different regions for one original image is changed, as the data for learning.

In the first aspect, the pseudo image may be an image generated on the basis of the original image by using generative adversarial networks (GAN).

In the first aspect, the pixel value may be a value indicating at least one of hue, saturation, brightness, or lightness represented by each pixel.

In the first aspect, the region of interest may be a region including at least one of the subject, a part of a tissue included in the subject, or an abnormal part included in the subject or the tissue.

In the first aspect, the original image may be an image obtained by at least one of a radiography apparatus, a magnetic resonance imaging apparatus, an ultrasonic apparatus, a fundus photography apparatus, or an endoscope.

According to a second aspect of the present disclosure, there is provided an information processing method executed by a computer, the method including causing a learning model that is used to extract a region of interest from an input image, to perform learning in response to an input of a pseudo image generated in a case where a pixel value of at least a part of an original image obtained by imaging a subject is changed, as data for learning.

In the second aspect, the method executed by a computer may further comprise causing the learning model, to perform learning in response to an input of a pair of the pseudo image and information indicating a region of interest included in the pseudo image, as the data for learning.

In the second aspect, the method executed by a computer may further comprise causing the learning model, to perform re-learning in response to a re-input of the pseudo image as the data for learning in a case where the learning model fails to extract a region of interest from the input pseudo image.

In the second aspect, the method executed by a computer may further comprise causing the learning model, to perform re-learning in response to a re-input of a pair of the pseudo image and information indicating the region of interest included in the pseudo image, as the data for learning, in a case where the learning model fails to extract the region of interest from the input pseudo image.

According to a third aspect of the present disclosure, there is provided an information processing program causing a computer to execute a process including causing a learning model that is used to extract a region of interest from an input image, to perform learning in response to an input of a pseudo image generated in a case where a pixel value of at least a part of an original image obtained by imaging a subject is changed, as data for learning.

In the third aspect, the program may cause the computer to execute the process further including causing the learning model, to perform learning in response to an input of a pair of the pseudo image and information indicating a region of interest included in the pseudo image, the data for learning.

In the third aspect, the program may cause the computer to execute the process further including causing the learning model, to perform re-learning in response to a re-input of the pseudo image as the data for learning in a case where the learning model fails to extract a region of interest from the input pseudo image.

In the third aspect, the program may cause the computer to execute the process further including causing the learning model, to perform re-learning in response to a re-input of a pair of the pseudo image and information indicating the region of interest included in the pseudo image, as the data for learning, in a case where the learning model fails to extract the region of interest from the input pseudo image.

With the information processing apparatus, the information processing method, and the information processing program of the present disclosure according to the above-described aspects, even an image that is unsuitable for extraction of a region of interest can be utilized for diagnosis.

DETAILED DESCRIPTION

Hereinafter, exemplary embodiments of technology according to the present disclosure will be described in detail with reference to the drawings.

First Embodiment

Figure 1:
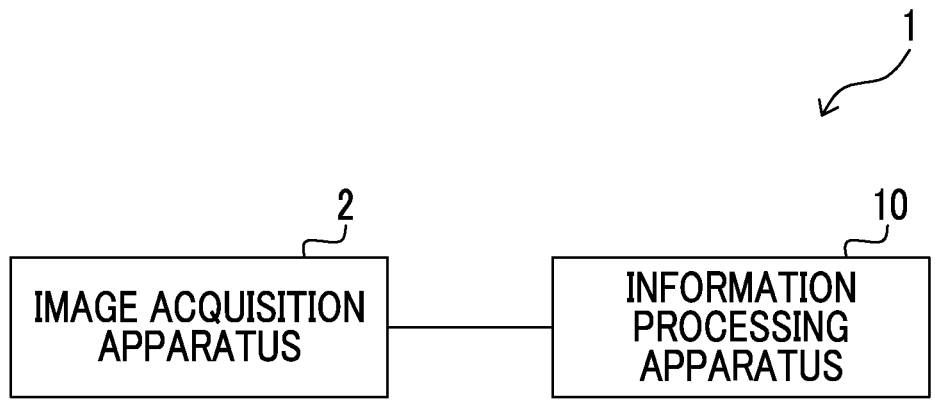
FIG. 1 is a schematic configuration diagram of an information processing system.

An example of a configuration of an information processing system 1 according to the present embodiment will be described with reference to FIG. 1. As shown in FIG. 1, the information processing system 1 includes an information processing apparatus 10 and an image acquisition apparatus 2. The information processing apparatus 10 and the image acquisition apparatus 2 can communicate with each other by wired or wireless communication.

The image acquisition apparatus 2 is an apparatus (so-called modality) that acquires an image obtained by imaging a subject. In the present embodiment, description will be made by using a medical image as a specific example of the image that is acquired by the image acquisition apparatus 2. As the image acquisition apparatus 2, at least one of a radiography apparatus, a magnetic resonance imaging apparatus, an ultrasonic apparatus, a fundus photography apparatus, or an endoscope can be applied, and an appropriate combination thereof may be applied.

Meanwhile, for example, in order to clearly image the fundus of an eye, it is necessary to perform imaging in a dark place, but medical institutions in emerging countries cannot create a sufficient dark place. In this case, an unclear medical image may be captured. In addition, for example, in order to clearly image a breast in mammography, it is necessary to sufficiently compress the breast, but the breast cannot be sufficiently compressed depending on the positioning technique of a photographer and the shape of the breast. In this case, an unclear medical image may be captured. In recent years, there has been a demand for technology in which even such an unclear image can be utilized for diagnosis.

Therefore, the information processing apparatus 10 according to the present embodiment has a function of determining whether or not an unclear region is included in the medical image. The term "unclear" means a case where a pixel value such as hue, saturation, brightness, and lightness represented by each pixel of the medical image does not satisfy a predetermined reference value. The unclear region may be generated, for example, in a case where the pixel becomes darker than the reference value due to insufficient light amount, or the pixel becomes brighter than the reference value due to ambient light. Hereinafter, an example of the configuration of the information processing apparatus 10 according to the present embodiment will be described.

Figure 2:
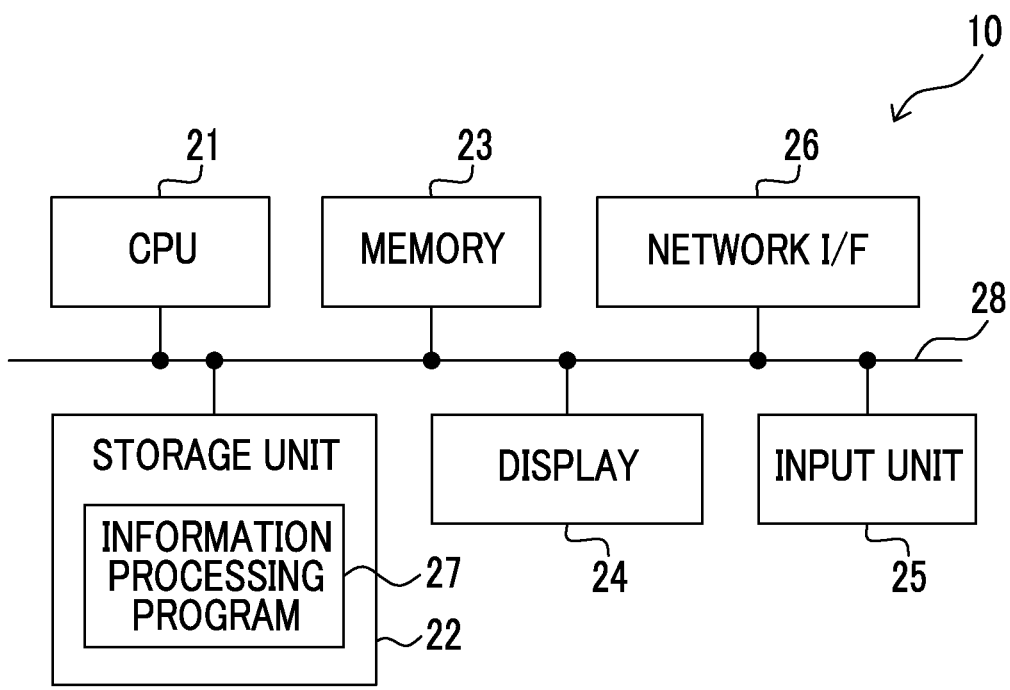
FIG. 2 is a block diagram showing an example of a hardware configuration of an information processing apparatus.

First, an example of a hardware configuration of the information processing apparatus 10 according to the present embodiment will be described with reference to FIG. 2. As shown in FIG. 2, the information processing apparatus 10 includes a central processing unit (CPU) 21, a non-volatile storage unit 22, and a memory 23 as a temporary storage area. In addition, the information processing apparatus 10 includes a display 24, such as a liquid crystal display, an input unit 25, such as a keyboard and a mouse, and a network I/F 26 that performs wired or wireless communication with the image acquisition apparatus 2 and an external network (not shown). The CPU 21, the storage unit 22, the memory 23, the display 24, the input unit 25, and the network I/F 26 are connected to one another via a bus 28 such as a system bus and a control bus so that various information can be exchanged.

The storage unit 22 is implemented with, for example, a storage medium such as a hard disk drive (HDD), a solid state drive (SSD), and a flash memory. The information processing program 27 according to the present embodiment is stored in the storage unit 22. The CPU 21 reads out the information processing program 27 from the storage unit 22, extracts the program to the memory 23, and executes the extracted information processing program 27. The CPU 21 is an example of a processor of the present disclosure. As the information processing apparatus 10, for example, various computers such as a console of the image acquisition apparatus 2, a workstation, a server computer, and a personal computer can be applied.

Figure 3:
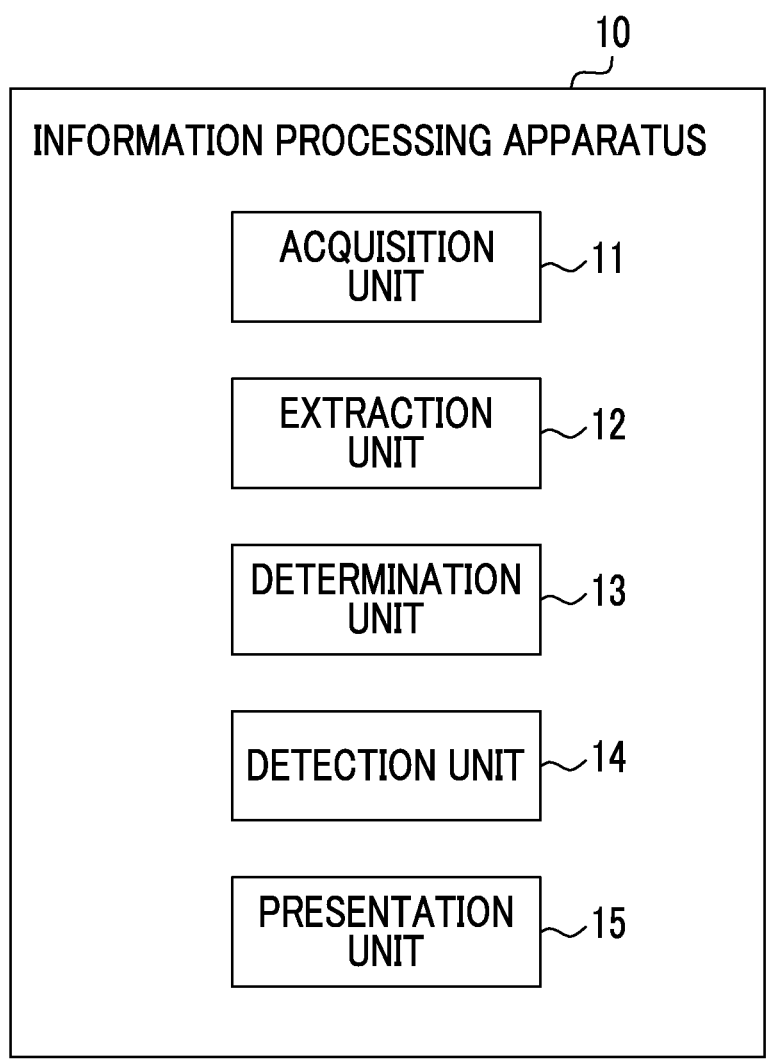
FIG. 3 is a block diagram showing an example of a functional configuration of an information processing apparatus according to a first embodiment.

Next, an example of a functional configuration of the information processing apparatus 10 according to the present embodiment will be described with reference to FIG. 3. As shown in FIG. 3, the information processing apparatus 10 includes an acquisition unit 11, an extraction unit 12, a determination unit 13, a detection unit 14, and a presentation unit 15. The CPU 21 executes the information processing program 27 to function as the acquisition unit 11, the extraction unit 12, the determination unit 13, the detection unit 14, and the presentation unit 15.

The acquisition unit 11 acquires a medical image obtained by imaging a subject, from the image acquisition apparatus 2. As a target structure for which detection and diagnosis are desired, a region of interest including at least one of the subject, a part of a tissue included in the subject, or an abnormal part included in the subject or the tissue is included in the medical image of the present embodiment. Examples of the subject include a human body and various organs of the human body such as the fundus of an eye, lungs, breast, stomach, liver, heart, and brain. Examples of the tissue include elements that constitute various organs such as blood vessels, nerves, and muscles. Examples of the abnormal part include a lesion such as tumors, injuries, defects, nodules, and inflammation, and an abnormality.

Figure 4:
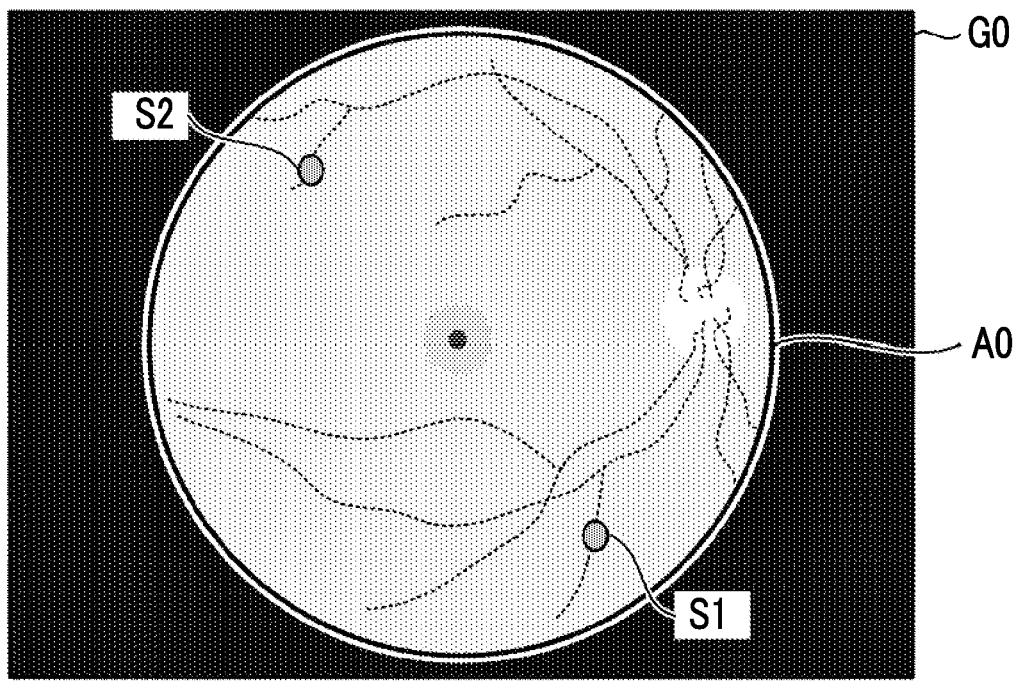
FIG. 4 is an example of a clear medical image.

FIG. 4 shows a medical image G0 as an example of a clear medical image. The medical image G0 is a clear image of the fundus of the eye obtained by the fundus photography apparatus. In the image of the fundus of the eye, since the abnormal part such as the lesion may be included in the entire imaging range including the fovea centralis, macula, optic nerve head, and blood vessels, the entire imaging range corresponds to a region of interest A0. In the example of FIG. 4, as an example of the abnormal part, abnormal shadows S1 and S2 are included in the region of interest A0.

Figure 5:
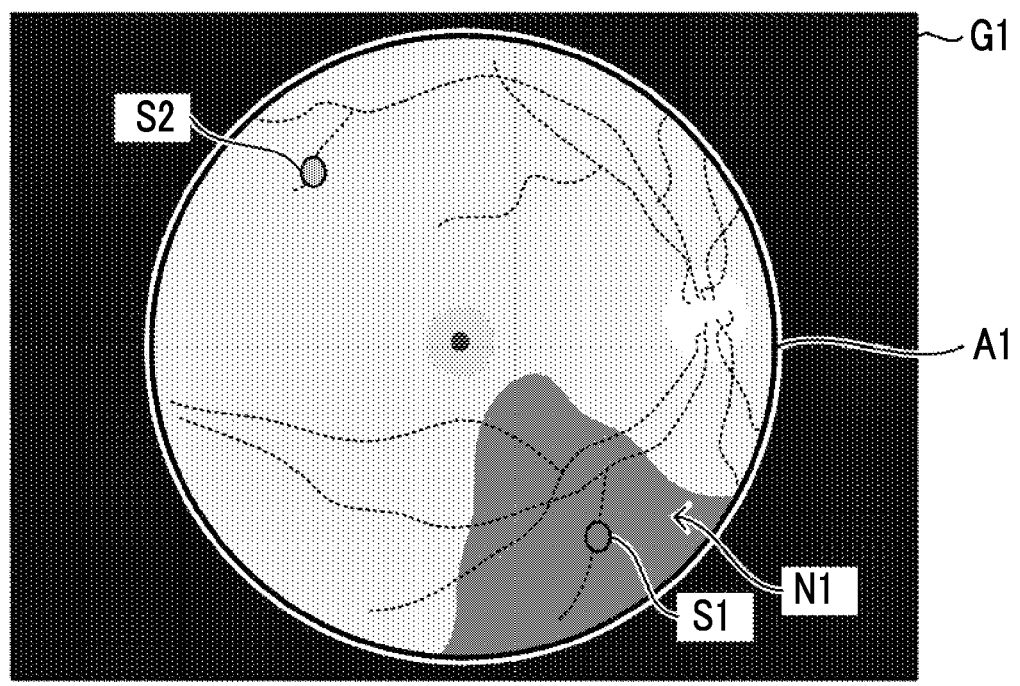
FIG. 5 is an example of an unclear first image.

On the other hand, FIG. 5 shows a first image G1 as an example of an unclear medical image. The first image G1 is an image of the same fundus of the eye as that in the medical image G0, but a part of the imaging range is unclear and an unsuitable region N1 that is unsuitable for extraction of an original first region of interest A1 (that is, the entire imaging range) exists. The unsuitable region N1 originally includes the abnormal shadow S1, but the unclearness of the unsuitable region N1 makes the detection thereof difficult. Hereinafter, description will be made assuming that the acquisition unit 11 acquires the first image G1.

The extraction unit 12 extracts the first region of interest A1 from the first image G1 acquired by the acquisition unit 11. As a method of extracting the first region of interest A1, a method using known image processing, a method using artificial intelligence (AI) technology, or the like can be appropriately applied. For example, the first image G1 may be binarized, the background may be removed, the edges of each structure may be emphasized, and the outline of the imaging range may be specified, so that the first region of interest A1 may be extracted. Alternatively, the extraction unit 12 may extract the imaging range (that is, the first region of interest A1) from the first image G1, for example, by using a learned model that has learned to extract and output the imaging range in response to an input of the image of the fundus of the eye.

The detection unit 14 detects an abnormal shadow included in the first region of interest A1 extracted by the extraction unit 12. In the example of the first image G1 of FIG. 5, the abnormal shadow S2 is detected by the detection unit 14, but the abnormal shadow S1 is not detected because the abnormal shadow S1 is included in the unclear unsuitable region N1. As a method of detecting the abnormal shadow, a known CAD technology can be appropriately applied.

The determination unit 13 determines whether or not the unsuitable region N1 that is unsuitable for extraction exists, for the first region of interest A1 extracted by the extraction unit 12. Various methods can be applied as the determination method. For example, the determination unit 13 may make the determination on the basis of a degree of similarity between the shape of the first region of interest A1 extracted by the extraction unit 12 and a predetermined reference shape for the first region of interest A1. Since the region of interest is the entire imaging range in a case of an image of the fundus of the eye, the reference shape can be predetermined to be substantially circular. Therefore, in a case where the degree of similarity between the shape of the outline of the first region of interest A1 extracted by the extraction unit 12 and the substantially circular reference shape is a predetermined threshold value or less (that is, the deviation is large), the unsuitable region N1 may be determined to exist. As a determination method based on the degree of similarity, known matching techniques such as matching by a feature amount and template matching can be appropriately applied.

Alternatively, for example, AI technology is applied to the determination, and determination may be made, by using a learned model that is used to determine whether or not the unsuitable region exists in the region of interest extracted from the medical image, in response to an input of the medical image. The learned model in this case may be a model of which learning has been performed by unsupervised learning or a model that has learned to, for example, cluster medical images according to the existence or non-existence of unsuitable regions. Alternatively, the learned model may be a model of which learning has been performed by supervised learning or a model of which learning has been performed by using, for example, a pair of the medical image and information indicating whether or not the unsuitable region exists in the region of interest extracted from the medical image, as data for learning.

Figure 6:
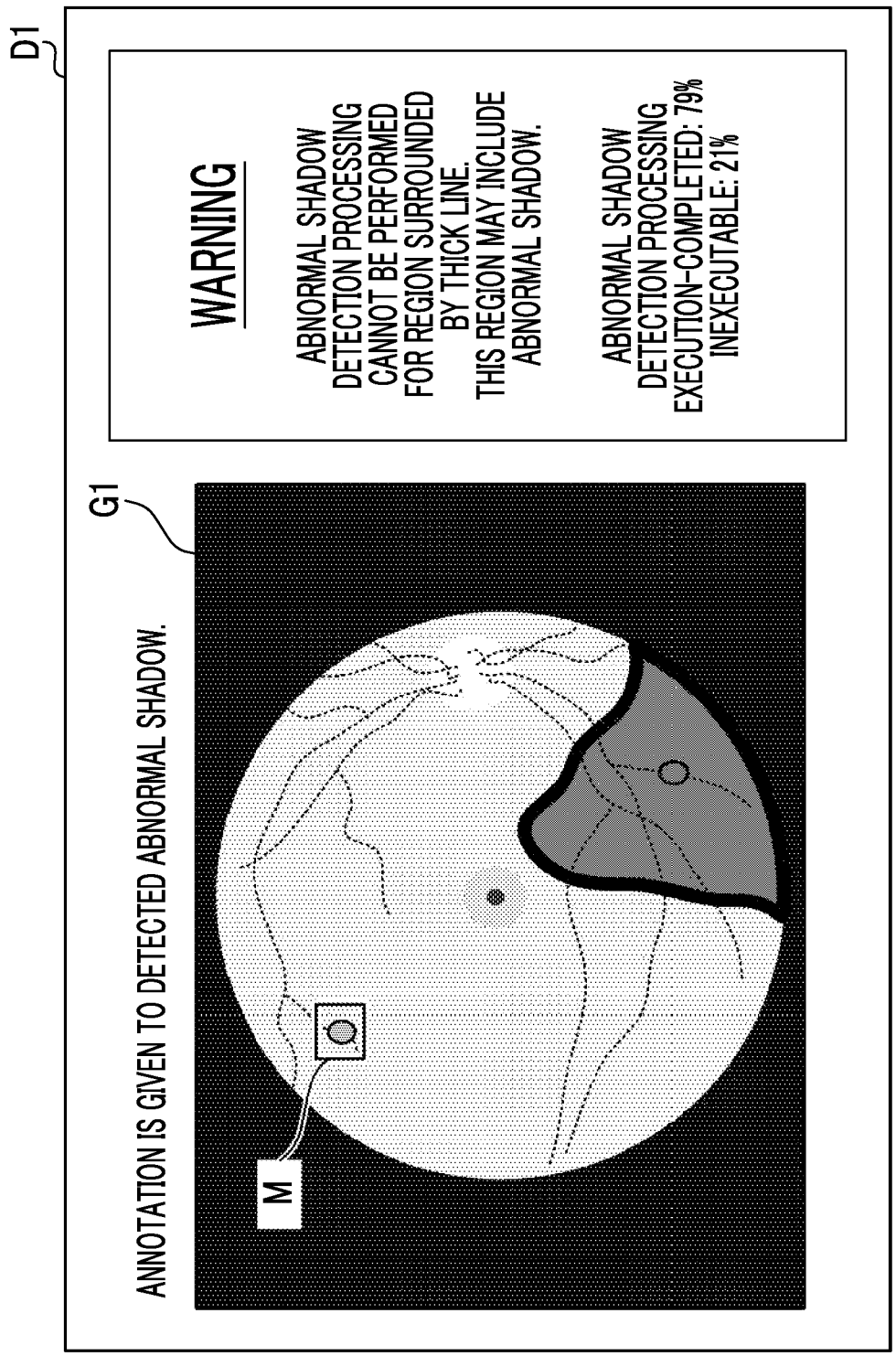
FIG. 6 is an example of a screen that is presented.

FIG. 6 shows an example of a screen D1 that is presented on the display 24 by the presentation unit 15. As shown in FIG. 6, the presentation unit 15 presents the abnormal shadow S2 detected by the detection unit 14 with annotation M added onto the first image G1.

Further, in a case where the determination unit 13 determines that the unsuitable region N1 exists in the first region of interest A1, the presentation unit 15 specifies and presents the unsuitable region N1 in the first image G1. In the example of FIG. 6, the presentation unit 15 presents the unsuitable region N1 surrounded by a thick line in the first image G1. The method of presenting the unsuitable region N1 is not limited thereto, and the unsuitable region N1 need only be emphasized so as to be discriminable, for example, by using a different line type (for example, the line thickness, color, solid line, and dotted line) from the other region, or annotation added. On the contrary, a region except for the unsuitable region N1 in the first region of interest A1 may be emphasized, to make the unsuitable region N1 discriminable.

Further, in a case where the determination unit 13 determines that the unsuitable region N1 exists in the first region of interest A1, the presentation unit 15 may present a ratio of the unsuitable region N1 to the first region of interest A1. In the example of FIG. 6, the unsuitable region N1 is illustrated as an "inexecutable" region in which abnormal shadow detection processing by the detection unit 14 cannot be performed. Further, the region except for the unsuitable region N1 in the first region of interest A1 is illustrated as an "execution-completed" region in which the detection of the abnormal shadow by the detection unit 14 is completed.

Figure 7:
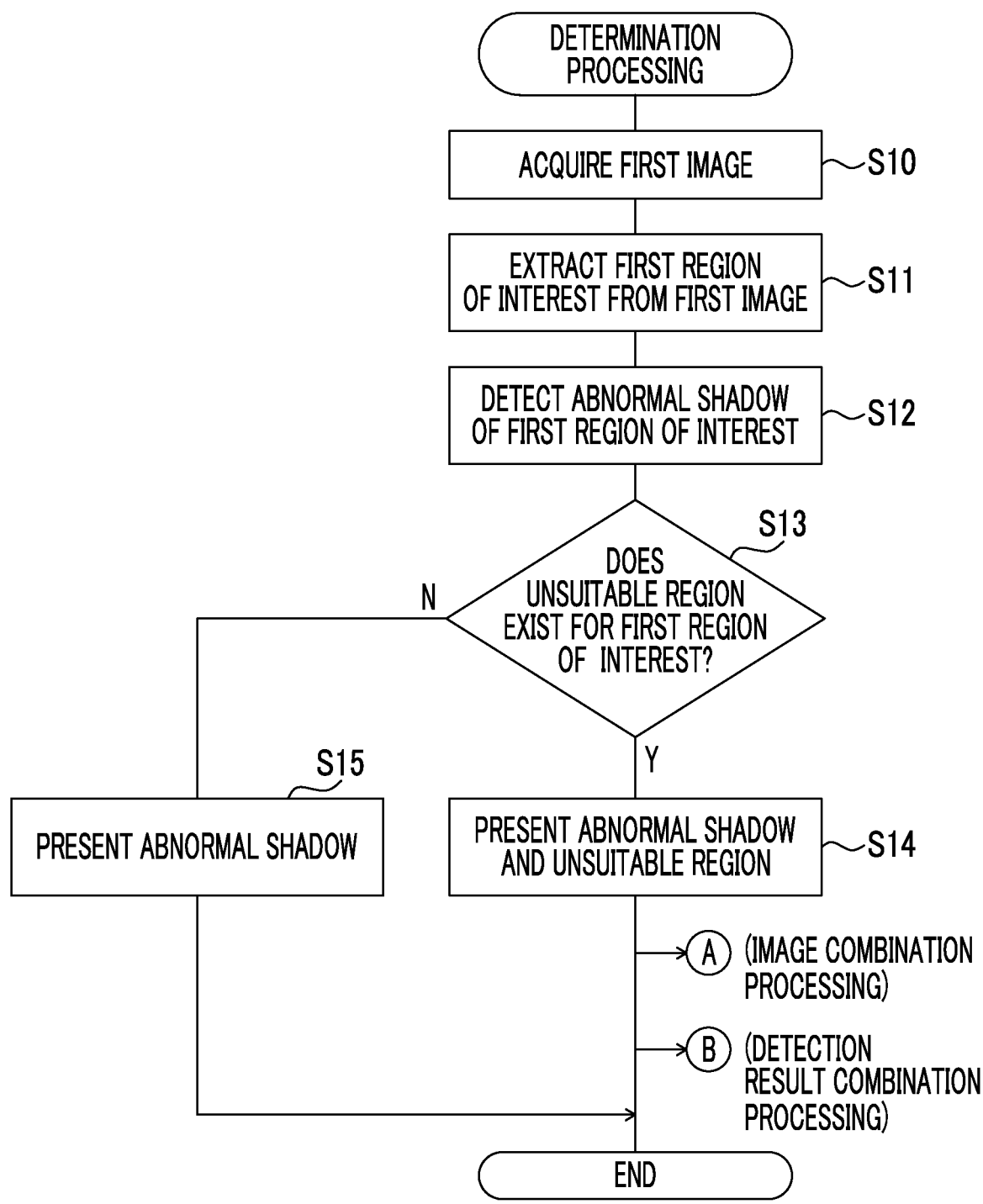
FIG. 7 is a flowchart showing an example of determination processing.

Next, an operation of the information processing apparatus 10 according to the present embodiment will be described with reference to FIG. 7. The CPU 21 executes the information processing program 27, so that determination processing shown in FIG. 7 is executed. The determination processing shown in FIG. 7 is executed, for example, in a case where a user gives an instruction on the start of the processing via the input unit 25.

In Step S10, the acquisition unit 11 acquires the first image G1 from the image acquisition apparatus 2. In Step S11, the extraction unit 12 extracts the first region of interest A1 from the first image G1 acquired in Step S10. In Step S12, the detection unit 14 detects the abnormal shadow included in the first region of interest A1 extracted in Step S11. In Step S13, the determination unit 13 determines whether or not the unsuitable region N1 that is unsuitable for extraction exists, for the first region of interest A1 extracted in Step S11.

In a case where the unsuitable region N1 exists (that is, in a case where affirmative determination is made in Step S13), the process proceeds to Step S14, and the presentation unit 15 specifies and presents the unsuitable region N1 in the first image G1 together with the abnormal shadow detected in Step S12. On the other hand, in a case where the unsuitable region N1 does not exist (that is, in a case where negative determination is made in Step S13), the process proceeds to Step S15, and the presentation unit 15 presents only the abnormal shadow detected in Step S12. When Step S14 or S15 is completed, the determination processing ends. After Step S14, image combination processing according to a second embodiment and/or detection result combination processing according to a third embodiment, which will be described later, may be performed.

As described above, the information processing apparatus 10 according to the first embodiment comprises at least one processor, and the processor acquires the first image G1 obtained by imaging the subject, extracts the first region of interest A1 from the first image G1, and determines whether or not the unsuitable region N1 that is unsuitable for extraction exists, for the extracted first region of interest A1. That is, the information processing apparatus 10 determines the existence or nonexistence of an unclear region in the first region of interest A1 that may include a target structure for which detection and diagnosis of abnormal shadows and the like are desired. Therefore, even the unclear first image G1 can be utilized for diagnosis on the basis of the recognition of the existence of an unclear region in the first image G1.

In the first embodiment, the detection unit 14 may detect only the abnormal shadow included in the region except for the unsuitable region N1 in the first region of interest A1, and may not detect the abnormal shadow in the unsuitable region N1. This is because the unclear unsuitable region N1 has a higher possibility of non-detection and erroneous detection of abnormal shadows as compared with other regions, and the reliability of the detection result is low.

On the other hand, in the first embodiment, in a case where the determination unit 13 determines that the unsuitable region N1 exists in the first region of interest A1, the detection unit 14 may detect the structure such as abnormal shadows included in the unsuitable region N1 with reduced detection accuracy. The phrase "detection with reduced detection accuracy" means that the possibility of non-detection and erroneous detection of abnormal shadows is allowed, and abnormal shadows are detected even in a case where the reliability is low. In this case, it is preferable that the presentation unit 15 presents that the detection accuracy of the abnormal shadows is reduced for the unsuitable region N1. Further, it is preferable to give presentation as described above particularly in a case where the ratio of the unsuitable region N1 to the first region of interest A1 is a predetermined threshold value or more (for example, 20% or more). This is because if detection of the abnormal shadow is not performed in the unsuitable region N1 in a case where the ratio of the unsuitable region N1 is high, the user is required to visually confirm the abnormal shadow for many parts of the first image G1 and the advantages of CAD are lost. According to such an aspect, the detection result of the abnormal shadow for the entire first image G1 can be utilized for diagnosis on the basis of the recognition of the reduced detection accuracy for the unclear region.

Further, in the first embodiment, an aspect in which the detection unit 14 detects the abnormal shadow has been described, but the information processing apparatus 10 according to the present embodiment may not have the function of the detection unit 14 (that is, the CAD function), and the user may visually confirm the abnormal shadow. According to such an aspect, in a case where the user is made to recognize the existence of the unclear region in the first image G1, oversight of the abnormal shadow by the user can be suppressed. Therefore, even the unclear first image G1 can be utilized for diagnosis by the user.

Further, in the first embodiment, in a case where the determination unit 13 determines that the unsuitable region N1 exists in the first region of interest A1, the extraction unit 12 may re-extract the first region of interest A1 with reduced extraction accuracy. The phrase "re-extraction with reduced extraction accuracy" means that it is allowed that other regions (for example, the background portion in FIG. 5) may be extracted as the first region of interest A1, and conditions in a case where the first region of interest A1 is extracted are changed so that the unsuitable region N1 is reduced. The conditions are determined by, for example, the brightness value of pixels.

Further, in this case, it is preferable that the presentation unit 15 presents that the extraction accuracy of the first region of interest A1 is reduced. Further, it is preferable to give presentation as described above particularly in a case where the ratio of the unsuitable region N1 to the first region of interest A1 is a predetermined threshold value or more (for example, 20% or more). This is because if many parts of the first image G1 are determined as the unsuitable region N1, it is difficult to complement the unsuitable region N1 (details will be described later). According to such an aspect, in a case where the user is made to recognize the reduced extraction accuracy of the first region of interest A1, oversight of the abnormal shadow by the user can be suppressed. Therefore, even the unclear first image G1 can be utilized for diagnosis by the user.

Second Embodiment

In the first embodiment, determination is made whether or not the unsuitable region N1 exists in the first image G1. In a case where determination is made that the unsuitable region N1 exists in the first image G1, the information processing apparatus 10 according to the present embodiment has a function of making a medical image that is different from the first image G1 complement the unsuitable region N1. Hereinafter, an example of the configuration of the information processing apparatus 10 according to the present embodiment will be described, but duplicate description will be omitted for the same configuration and operation as those of the first embodiment.

Figure 8:
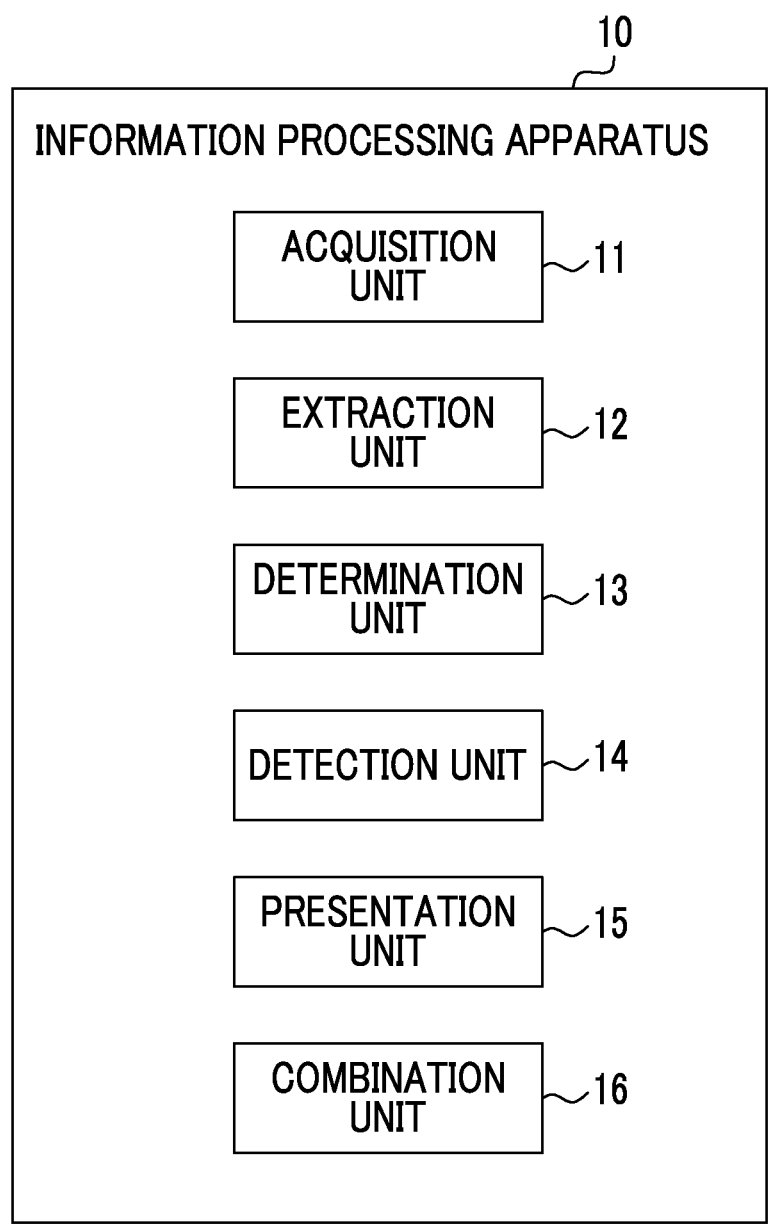
FIG. 8 is a block diagram showing an example of a functional configuration of an information processing apparatus according to second and third embodiments.

An example of a functional configuration of the information processing apparatus 10 according to the present embodiment will be described with reference to FIG. 8. As shown in FIG. 8, the information processing apparatus 10 according to the present embodiment includes a combination unit 16, in addition to the same acquisition unit 11, extraction unit 12, determination unit 13, detection unit 14, and presentation unit 15 as in the first embodiment. The CPU 21 executes the information processing program 27 to function as the acquisition unit 11, the extraction unit 12, the determination unit 13, the detection unit 14, the presentation unit 15, and the combination unit 16.

Figure 9:
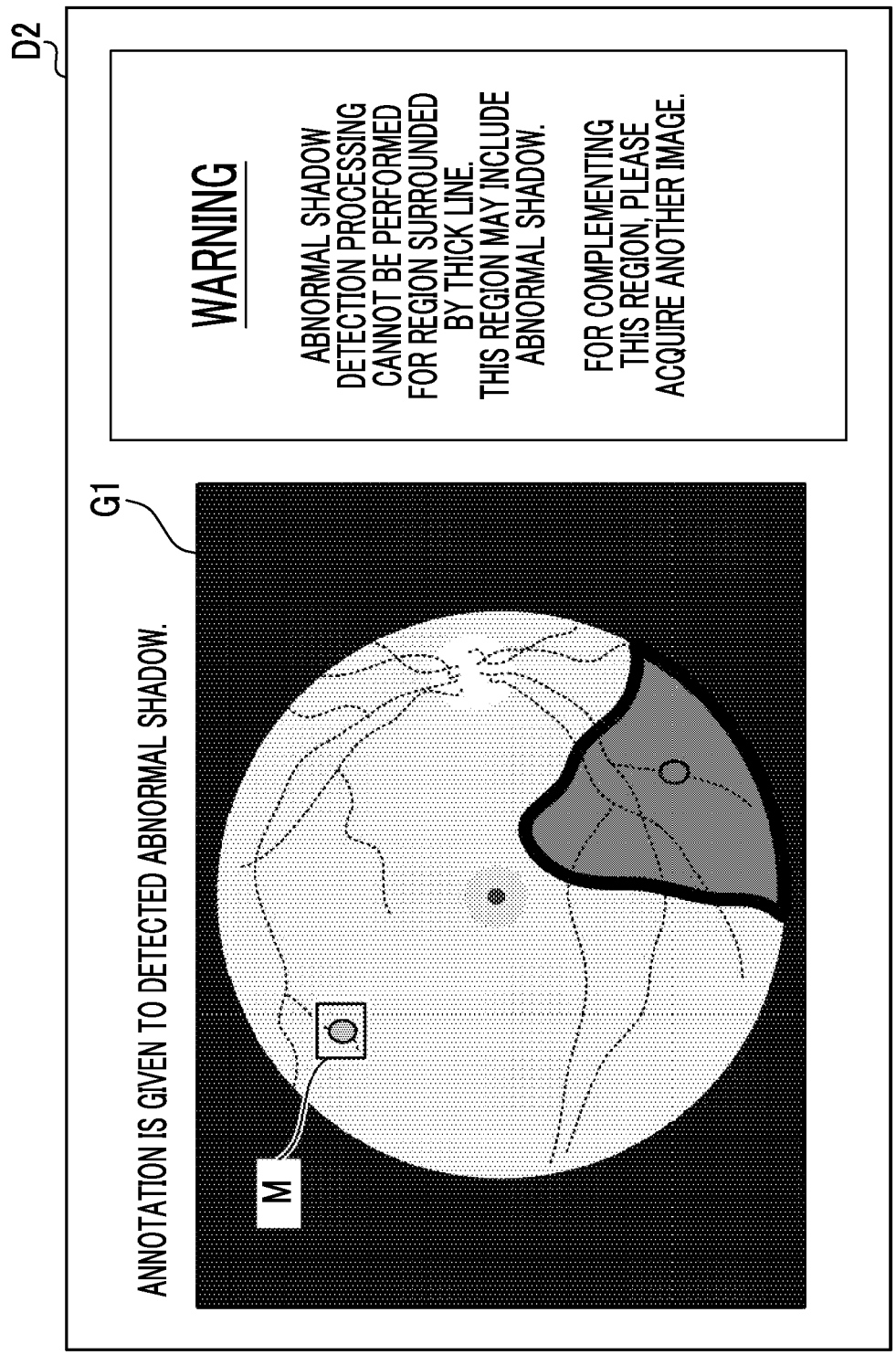
FIG. 9 is an example of another screen that is presented.

FIG. 9 shows an example of a screen D2 that is presented on the display 24 by the presentation unit 15. As shown in FIG. 9, in a case where the determination unit 13 determines that the unsuitable region N1 exists in the first region of interest A1 of the first image G1, the presentation unit 15 requests a second image G2 including a region corresponding to at least a part of the unsuitable region N1.

Figure 10:
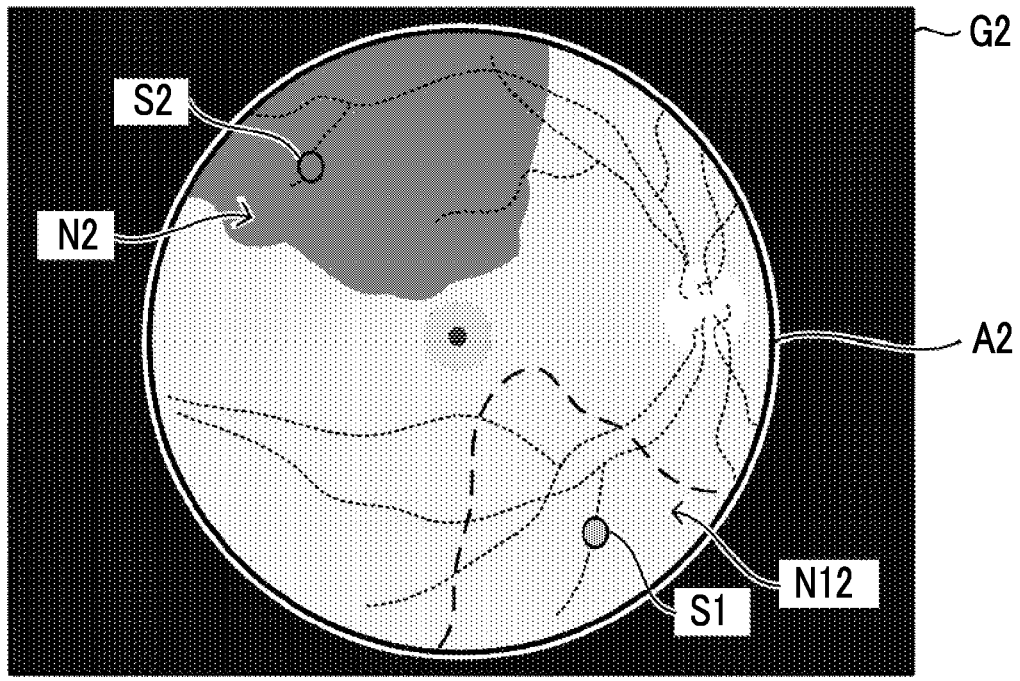
FIG. 10 is an example of an unclear second image.

The acquisition unit 11 acquires the second image G2 from the image acquisition apparatus 2. FIG. 10 shows the second image G2. The second image G2 is an image of the same fundus of the eye as that in the medical image G0, and a region N12 (shown by the broken line) corresponding to the unsuitable region N1 of the first image G1 is clearly reflected. On the other hand, a part of the imaging range is unclear, and an unsuitable region N2 that is unsuitable for the extraction of an original second region of interest A2 (that is, the entire imaging range) also exists. The unsuitable region N2 originally includes an abnormal shadow S2, but the unclearness of the unsuitable region N2 makes the detection thereof difficult.

Figure 11:
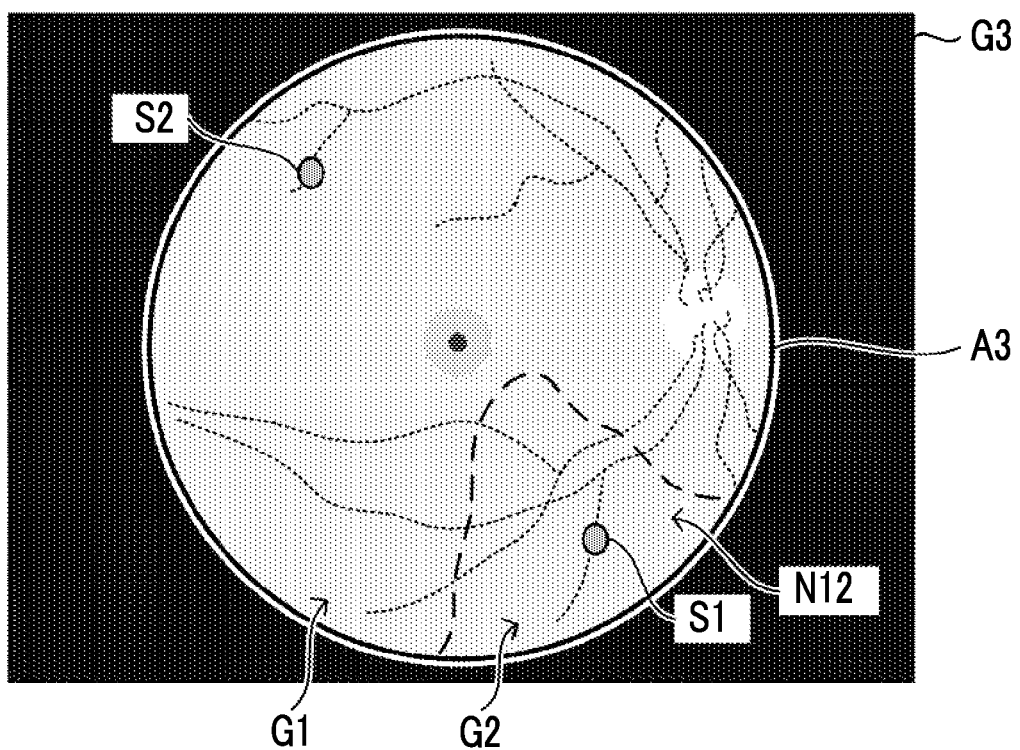
FIG. 11 is an example of a combined third image.

The combination unit 16 combines the first image G1 and the second image G2 acquired by the acquisition unit 11, to generate a third image G3. Specifically, the combination unit 16 combines any one image of the first image G1 or the second image G2 with a part of the other image so that the unsuitable region in the one image is complemented by a corresponding region in the other image, to generate the third image G3. In the third image G3 shown in FIG. 11, a part of the second image G2 is combined into the first image G1 so that the unsuitable region N1 in the first image G1 is complemented by the region N12 corresponding to the unsuitable region N1 in the second image G2.

The extraction unit 12 extracts a third region of interest A3 from the third image G3 combined by the combination unit 16, by using the same method as a method in which the first region of interest A1 is extracted from the first image G1.

The determination unit 13 determines whether or not an unsuitable region exists, for the third region of interest A3 extracted by the extraction unit 12. For example, in a case where a part of the region N12 of the second image G2 corresponding to the unsuitable region N1 of the first image G1 is unclear, the second image G2 alone cannot complement the first image G1. Therefore, the CPU 21 repeats request and acquisition of a new image including a region corresponding to at least a part of the unsuitable region and re-combination of the new image and the third image G3, until the determination unit 13 determines that the unsuitable region does not exist in the third region of interest A3. The request, acquisition, and combination of the new image are performed in the same manner as the request, acquisition, and combination of the second image G2 described above.

In a case where the determination unit 13 determines that the unsuitable region does not exist in the third region of interest A3, the detection unit 14 detects the abnormal shadow included in the third region of interest A3 extracted by the extraction unit 12, by using the same method as a method in which the abnormal shadow included in the first region of interest A1 is detected. In the example of the third image G3 of FIG. 11, the detection unit 14 can detect both the abnormal shadows S1 and S2.

Figure 12:
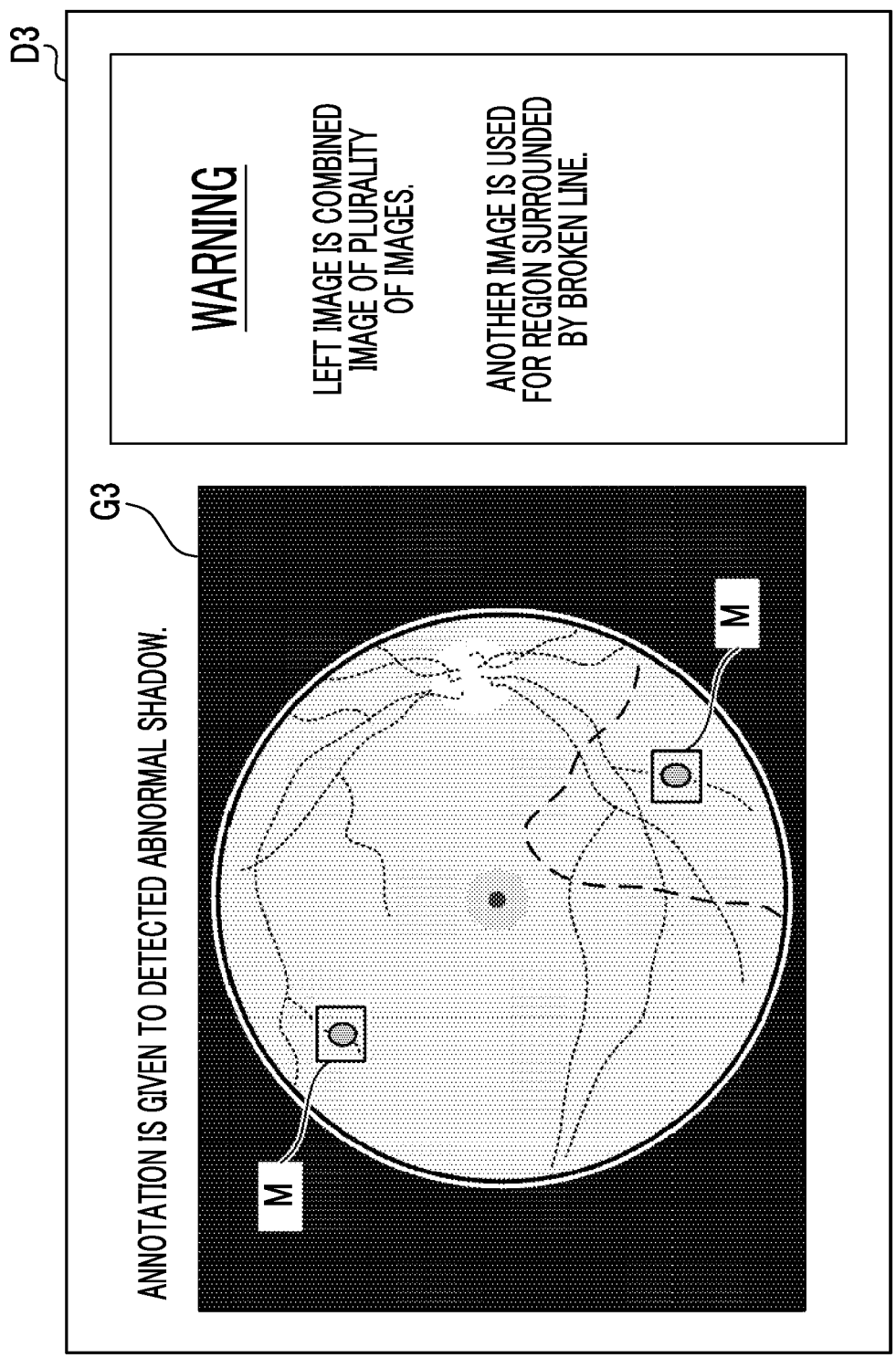
FIG. 12 is an example of another screen that is presented.

FIG. 12 shows an example of a screen D3 that is presented on the display 24 by the presentation unit 15. As shown in FIG. 12, the presentation unit 15 presents the abnormal shadows S1 and S2 detected by the detection unit 14 with annotation M added onto the third image G3.

Figure 13:
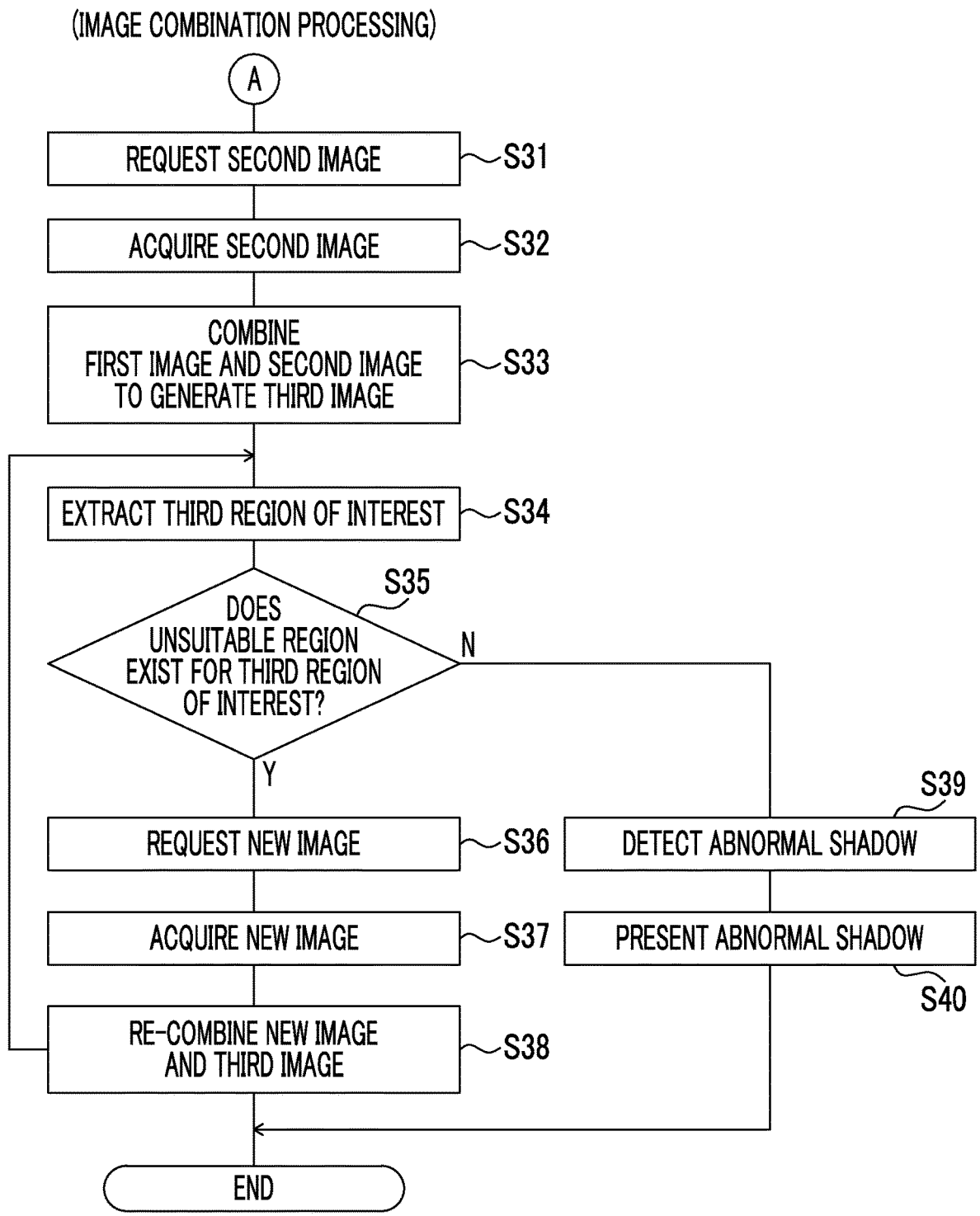
FIG. 13 is a flowchart showing an example of image combination processing.

Next, an operation of the information processing apparatus 10 according to the present embodiment will be described with reference to FIG. 13. The CPU 21 executes the information processing program 27, so that image combination processing shown in FIG. 13 is executed. The image combination processing shown in FIG. 13 is executed after Step S14 in the flowchart of FIG. 7. That is, in a case where determination is made in the determination processing of the first embodiment that the unsuitable region N1 exists in the first image G1, the processing is executed.

In Step S31, the presentation unit 15 requests the second image G2 including a region corresponding to at least a part of the unsuitable region N1 specified in Step S14. In Step S32, the acquisition unit 11 acquires the second image G2 from the image acquisition apparatus 2. In Step S33, the combination unit 16 combines the first image G1 acquired in Step S10 and the second image G2 acquired in Step S32 to generate the third image G3.

In Step S34, the extraction unit 12 extracts the third region of interest A3 from the third image G3 combined in Step S33. In Step S35, the determination unit 13 determines whether or not the unsuitable region that is unsuitable for extraction exists, for the third region of interest A3 extracted in Step S34.

In a case where the unsuitable region exists (that is, in a case where affirmative determination is made in Step S35), the process proceeds to Step S36, and the presentation unit 15 requests a new image including a region corresponding to at least a part of the unsuitable region. In Step S37, the acquisition unit 11 acquires the new image from the image acquisition apparatus 2. In Step S38, the combination unit 16 re-combines the new image acquired in Step S37 and the third image G3 combined in Step S33. When Step S38 is completed, the process returns to Step S34. That is, the processing of Steps S34 to S38 is repeated until determination is made in Step S35 that the unsuitable region does not exist in the third region of interest A3.

On the other hand, in a case where the unsuitable region does not exist (that is, in a case where negative determination is made in Step S35), the process proceeds to Step S39, and the detection unit 14 detects the abnormal shadow included in the third region of interest A3 extracted in Step S34. In Step S40, the presentation unit 15 presents the abnormal shadow detected in Step S39, and the image combination processing ends.

As described above, the information processing apparatus 10 according to the second embodiment comprises at least one processor, and in a case where determination is made that the unsuitable region N1 exists in the first region of interest A1 of the first image G1, the processor requests the second image including a region corresponding to at least a part of the unsuitable region N1 and combines the first image G1 and the second image G2. That is, in a case where determination is made that the unsuitable region N1 exists in the first image G1, the information processing apparatus 10 makes the second image G2 that is different from the first image G1 complement the unsuitable region N1. Therefore, even the first image G1 and the second image G2 each of which is unclear can be utilized for diagnosis.

In the second embodiment, an aspect in which the unsuitable region in any one image of the first image G1 or the second image G2 is complemented by the other image by the combination unit 16 has been described, but the present disclosure is not limited thereto. For example, the combination unit 16 may select and combine one image having better image quality for each plurality of sections in the first image G1 and the second image G2, to generate the third image G3. The term "section" means, for example, a pixel and a block that is constituted of plural pixels. The quality of the image quality can be evaluated on the basis of, for example, a pixel value such as hue, saturation, brightness, and lightness represented by each pixel. Further, with the combination of the aspects, the combination unit 16 may select and combine one image having better image quality for each section, for a region except for the unsuitable region while making the other image complement the unsuitable region.

Further, in the second embodiment, for example, particularly in a case where the combination unit 16 repeats the re-combination based on the new image more than a predetermined number of times (for example, 3 times), the extraction unit 12 may re-extract the third region of interest A3 with reduced extraction accuracy. This is for finishing the processing in a case where the unsuitable region is not complemented even if the re-combination is repeated. In this case, it is preferable that the presentation unit 15 presents that the extraction accuracy of the third region of interest A3 is reduced.

Further, in the second embodiment, an aspect in which the acquisition and combination of the new image are repeated until the unsuitable region does not exist in the third image G3 has been described, but the present disclosure is not limited thereto. In a case where the combination unit 16 performs combination at least once, the combination processing may be finished even if the unsuitable region exists. For example, in a case where a limit based on the number of times of combination (for example, 3 times) may be set and the number of times of combination exceeds the limit, the processing may be finished even if the unsuitable region exists. Further, for example, in a case where the ratio of the unsuitable region to the third region of interest A3 of the third image G3 is a predetermined threshold value or less (for example, 5% or less), the processing may be finished even if the unsuitable region exists. In these cases, the presentation unit 15 may present the ratio of the unsuitable region to the third region of interest A3.

Further, in a case where the processing is finished in a state in which the unsuitable region exists, the structure such as an abnormal shadow included in the third region of interest A3 may be detected with reduced detection accuracy. In this case, it is preferable that the presentation unit 15 presents that the detection accuracy of the abnormal shadows is reduced for the unsuitable region. Further, it is preferable to give presentation as described above particularly in a case where the ratio of the unsuitable region to the third region of interest A3 is a predetermined threshold value or more (for example, 20% or more). This is because if detection of the abnormal shadow is not performed in the unsuitable region in a case where the ratio of the unsuitable region is high, the user is required to visually confirm the abnormal shadow for many parts of the third image G3 and the advantages of CAD are lost. According to such an aspect, the detection result of the abnormal shadow for the entire third image G3 can be utilized for diagnosis on the basis of the recognition of the reduced detection accuracy for the unclear region.

Further, in the second embodiment, an aspect in which the detection unit 14 detects the abnormal shadow has been described, but the information processing apparatus 10 according to the present embodiment may not have the function of the detection unit 14 (that is, the CAD function), and the user may visually confirm the abnormal shadow. In such an aspect, even the first image G1 and the second image G2 each of which is unclear can also be utilized for diagnosis by the user.

Further, in the second embodiment, an aspect in which the image combination processing is performed in a case where determination is made in the determination processing of the first embodiment that the unsuitable region N1 exists in the first image G1 has been described, but the present disclosure is not limited thereto. For example, in the first image G1, in a case where the ratio of the unsuitable region N1 to the first region of interest A1 is a predetermined threshold value or more (for example, 20% or more), the image combination processing according to the present embodiment may be performed.

Third Embodiment

In the second embodiment, the abnormal shadow is detected on the basis of the third image G3 in which the first image G1 and the second image G2 are combined. The information processing apparatus 10 according to the present embodiment has a function of detecting the abnormal shadow on the basis of each of the first image G1 and the second image G2 and combining the detection results. Hereinafter, an example of the configuration of the information processing apparatus 10 according to the present embodiment will be described, but duplicate description will be omitted for the same configuration and operation as those of the first and second embodiments.

As in the second embodiment, an example of the functional configuration of the information processing apparatus 10 according to the present embodiment will be described with reference to FIG. 8. As shown in FIG. 8, the information processing apparatus 10 according to the present embodiment includes the combination unit 16, in addition to the same acquisition unit 11, extraction unit 12, determination unit 13, detection unit 14, and presentation unit 15 as in the first embodiment. The CPU 21 executes the information processing program 27 to function as the acquisition unit 11, the extraction unit 12, the determination unit 13, the detection unit 14, the presentation unit 15, and the combination unit 16.

FIG. 9 shows an example of the screen D2 that is presented on the display 24 by the presentation unit 15. As shown in FIG. 9, in a case where the determination unit 13 determines that the unsuitable region N1 exists in the first region of interest A1 of the first image G1, the presentation unit 15 requests the second image G2 including a region corresponding to at least a part of the unsuitable region N1. The acquisition unit 11 acquires the second image G2 (see FIG. 10) from the image acquisition apparatus 2. Since the description of the second image G2 is the same as that of the second embodiment, the description thereof will be omitted.

The extraction unit 12 extracts the second region of interest A2 from the second image G2 acquired by the acquisition unit 11, by using the same method as a method in which the first region of interest A1 is extracted from the first image G1. The detection unit 14 detects the abnormal shadow included in each of the first region of interest A1 and the second region of interest A2 extracted by the extraction unit 12, by using the same method as a method in which the abnormal shadow included in the first region of interest A1 is detected. In the examples of FIGS. 5 and 10, the detection unit 14 detects the abnormal shadow S2 from the first image G1 and detects the abnormal shadow S1 from the second image G2.

The combination unit 16 combines the detection results of the abnormal shadows that are detected respectively from the first region of interest A1 and the second region of interest A2, by the detection unit 14. That is, the combination unit 16 combines the detection results of abnormal shadows obtained from plural different images as the detection results of abnormal shadows for the same subject.

The determination unit 13 determines whether or not a common unsuitable region that is unsuitable for extraction in common exists, for the first region of interest A1 and the second region of interest A2 extracted by the extraction unit 12. The existence of the common unsuitable region may lead to oversight of the abnormal shadow. Therefore, the CPU 21 repeats request and acquisition of a new image including a region corresponding to at least a part of the common unsuitable region, extraction of a region of interest from the new image, detection of the abnormal shadow included in the region of interest, and re-combination of the detection result of the abnormal shadow and the detection result of the abnormal shadow detected so far, until the determination unit 13 determines that the common unsuitable region does not exist. The request and acquisition of the new image, the extraction of the region of interest, and the detection of the abnormal shadow are performed in the same manner as the request and acquisition of the second image G2, the extraction of the region of interest, and the detection of the abnormal shadow described above.

Figure 14:
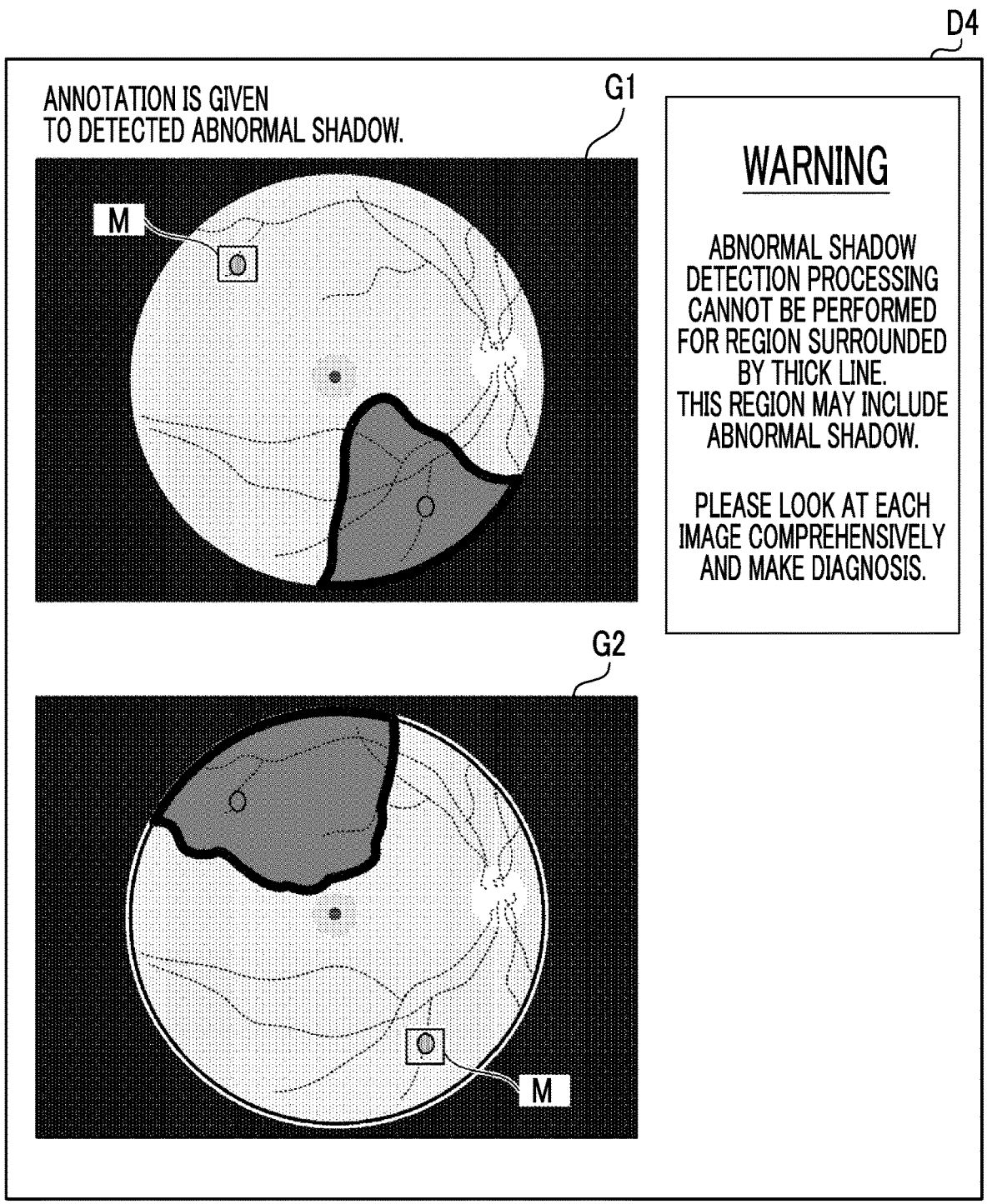
FIG. 14 is an example of another screen that is presented.

FIG. 14 shows an example of a screen D4 that is presented on the display 24 by the presentation unit 15. As shown in FIG. 14, the presentation unit 15 presents the detection results of the abnormal shadows combined by the combination unit 16 with annotation M added onto each image. As in the second embodiment, the combination unit 16 may generate an image in which the first image G1 and the second image G2 are combined, and the presentation unit 15 may present the detection results of the abnormal shadows combined by the combination unit 16 on the image (that is, one image) with annotation M added thereto.

Figure 15:
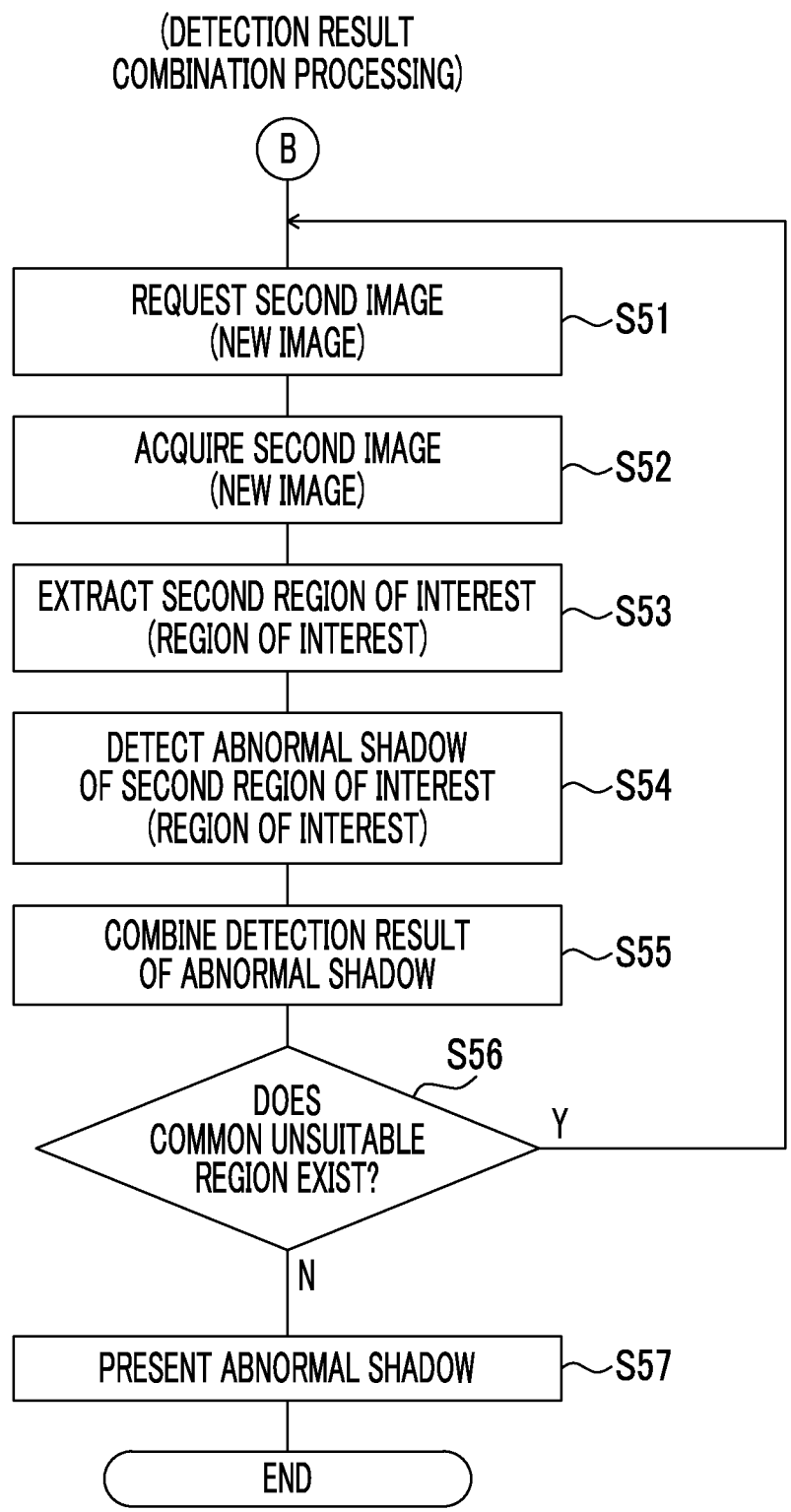
FIG. 15 is a flowchart showing an example of detection result combination processing.

Next, an operation of the information processing apparatus 10 according to the present embodiment will be described with reference to FIG. 15. The CPU 21 executes the information processing program 27, so that detection result combination processing shown in FIG. 15 is executed. The detection result combination processing shown in FIG. 15 is executed after Step S14 in the flowchart of FIG. 7. That is, in a case where determination is made in the determination processing of the first embodiment that the unsuitable region N1 exists in the first image G1, the processing is executed.

In Step S51, the presentation unit 15 requests the second image G2 including a region corresponding to at least a part of the unsuitable region N1 specified in Step S14. In Step S52, the acquisition unit 11 acquires the second image G2 from the image acquisition apparatus 2. In Step S53, the extraction unit 12 extracts the second region of interest A2 from the second image G2 acquired in Step S52. In Step S54, the detection unit 14 detects the abnormal shadow included in the second region of interest A2 extracted in Step S53.

In Step S55, the combination unit 16 combines the detection result of the abnormal shadow included in the first region of interest A1 detected in Step S12 and the detection result of the abnormal shadow included in the second region of interest A2 detected in Step S54. In Step S56, the determination unit 13 determines whether or not a common unsuitable region that is unsuitable for extraction in common exists, for the first region of interest A1 extracted in Step S11 and the second region of interest A2 extracted in Step S53.

In a case where the common unsuitable region exists (that is, in a case where affirmative determination is made in Step S56), the processing of Steps S51 to S56 is performed, for the new image including a region corresponding to at least a part of the common unsuitable region. That is, the processing of Steps S51 to S56 is repeated until determination is made in Step S56 that the common unsuitable region does not exist.

On the other hand, in a case where the common unsuitable region does not exist (that is, in a case where negative determination is made in Step S56), the process proceeds to Step S57, and the presentation unit 15 presents the detection results of the abnormal shadows combined in Step S55. When Step S57 is completed, the detection result combination processing ends.

As described above, the information processing apparatus 10 according to the third embodiment comprises at least one processor, and in a case where determination is made that the unsuitable region N1 exists in the first region of interest A1 of the first image G1, the processor requests the second image including a region corresponding to at least a part of the unsuitable region N1. Further, the information processing apparatus 10 extracts the second region of interest A2 from the second image G2, detects the abnormal shadow included in each of the first region of interest A1 and the second region of interest A2, and combines the detection results of the abnormal shadows. That is, in a case where determination is made that the unsuitable region N1 exists in the first image G1, the information processing apparatus 10 makes the second image G2 that is different from the first image G1 complement the detection result of the abnormal shadow. Therefore, even the first image G1 and the second image G2 each of which is unclear can be utilized for diagnosis.

In the third embodiment, for example, particularly in a case where the combination unit 16 repeats the re-combination of the detection result of the abnormal shadow included in the new image more than a predetermined number of times (for example, 3 times), the extraction unit 12 may extract a region of interest of the new image with reduced extraction accuracy. This is for finishing the processing in a case where the common unsuitable region does not disappear even if the re-combination is repeated. In this case, it is preferable that the presentation unit 15 presents that the extraction accuracy of the region of interest is reduced.

Further, in the third embodiment, an aspect in which the combination of the detection result of the abnormal shadow based on the new image is repeated until the common unsuitable region does not exist has been described, but the present disclosure is not limited thereto. In a case where the combination unit 16 performs combination of the detection result at least once, the combination processing may be finished even if the common unsuitable region exists. For example, in a case where a limit based on the number of times of combination (for example, 3 times) is set and the number of times of combination exceeds the limit, the processing may be finished even if the common unsuitable region exists. Further, for example, in a case where the ratio of the common unsuitable region to the first region of interest A1 or the second region of interest A2 is a predetermined threshold value or less (for example, 5% or less), the processing may be finished even if the common unsuitable region exists.

Further, in a case where the processing is finished in a state in which the common unsuitable region exists, the structure such as an abnormal shadow included in the common unsuitable region may be detected with reduced detection accuracy. In this case, it is preferable that the presentation unit 15 presents that the detection accuracy of the abnormal shadows is reduced for the common unsuitable region. Further, it is preferable to give presentation as described above particularly in a case where the ratio of the common unsuitable region to the first region of interest A1 or the second region of interest A2 is a predetermined threshold value or more (for example, 20% or more). This is because if detection of the abnormal shadow is not performed in the common unsuitable region in a case where the ratio of the common unsuitable region is high, the user is required to visually confirm the abnormal shadow for many parts of the first image G1 and the second image G2 and the advantages of CAD are lost. According to such an aspect, the detection result of the abnormal shadow for the entire first image G1 and second image G2 can be utilized for diagnosis on the basis of the recognition of the reduced detection accuracy for the unclear region.

Further, in the third embodiment, an aspect in which the detection result combination processing is performed in a case where determination is made in the determination processing of the first embodiment that the unsuitable region N1 exists in the first image G1 has been described, but the present disclosure is not limited thereto. For example, in the first image G1, in a case where the ratio of the unsuitable region N1 to the first region of interest A1 is a predetermined threshold value or more (for example, 20% or more), the detection result combination processing according to the present embodiment may be performed.

Fourth Embodiment

In the first to third embodiments, an aspect in which the extraction unit 12 extracts the region of interest from the medical image has been described. As described above, as a method of extracting the region of interest by the extraction unit 12, a learned model that has learned to extract and output the region of interest in response to the input of the medical image may be used. In this case, the learned model is required to be able to accurately extract the region of interest even in a case where an unclear medical image as shown in FIGS. 5 and 10 is input.

As one method for improving the accuracy of the learned model, there is a method of performing learning by using unclear medical images having various patterns, as data for learning. However, it has been difficult for the image acquisition apparatus 2 to acquire a sufficient number and patterns of unclear medical images. Therefore, in the present embodiment, an object thereof is to improve the accuracy of a learning model by using an unclear medical image that is intentionally generated as data for learning.

As an example, an aspect in which the information processing apparatus 10 according to the present embodiment causes a learning model 4 that is used by the extraction unit 12 to perform learning by unsupervised learning will be described. The learning model 4 is a model that includes a deep learning model such as a convolutional neural network (CNN), a fully convolutional network (FCN), and U-Net, and that has learned to extract and output a region of interest in response to the input of a medical image. Further, as such a model, for example, the technology described in JP2020-032043A, JP2019-088458A, and JP2020-114302A may be applied.

The CPU 21 acquires an original image obtained by imaging the subject, from the image acquisition apparatus 2. That is, the original image is an image obtained by at least one image acquisition apparatus 2 of a radiography apparatus, a magnetic resonance imaging apparatus, an ultrasonic apparatus, a fundus photography apparatus, or an endoscope. Further, the original image includes a region of interest including at least one structure, such as the subject, a part of a tissue included in the subject, and an abnormal part included in the subject or the tissue. Hereinafter, as an example of the original image, an example using the clear medical image G0 shown in FIG. 4 will be described. Since the medical image G0 is as described above, the description thereof will be omitted.

The CPU 21 changes the pixel value of at least a part of the medical image G0 to generate a pseudo image. The pixel value is a value indicating at least one of hue, saturation, brightness, or lightness represented by each pixel in the medical image G0. For example, in a case where the lightness and contrast of the medical image G0 are changed or blurring and noise are given thereto, the pixel value of each pixel is changed. Note that, the CPU 21 does not change the resolution in generating the pseudo image.

Figure 16:
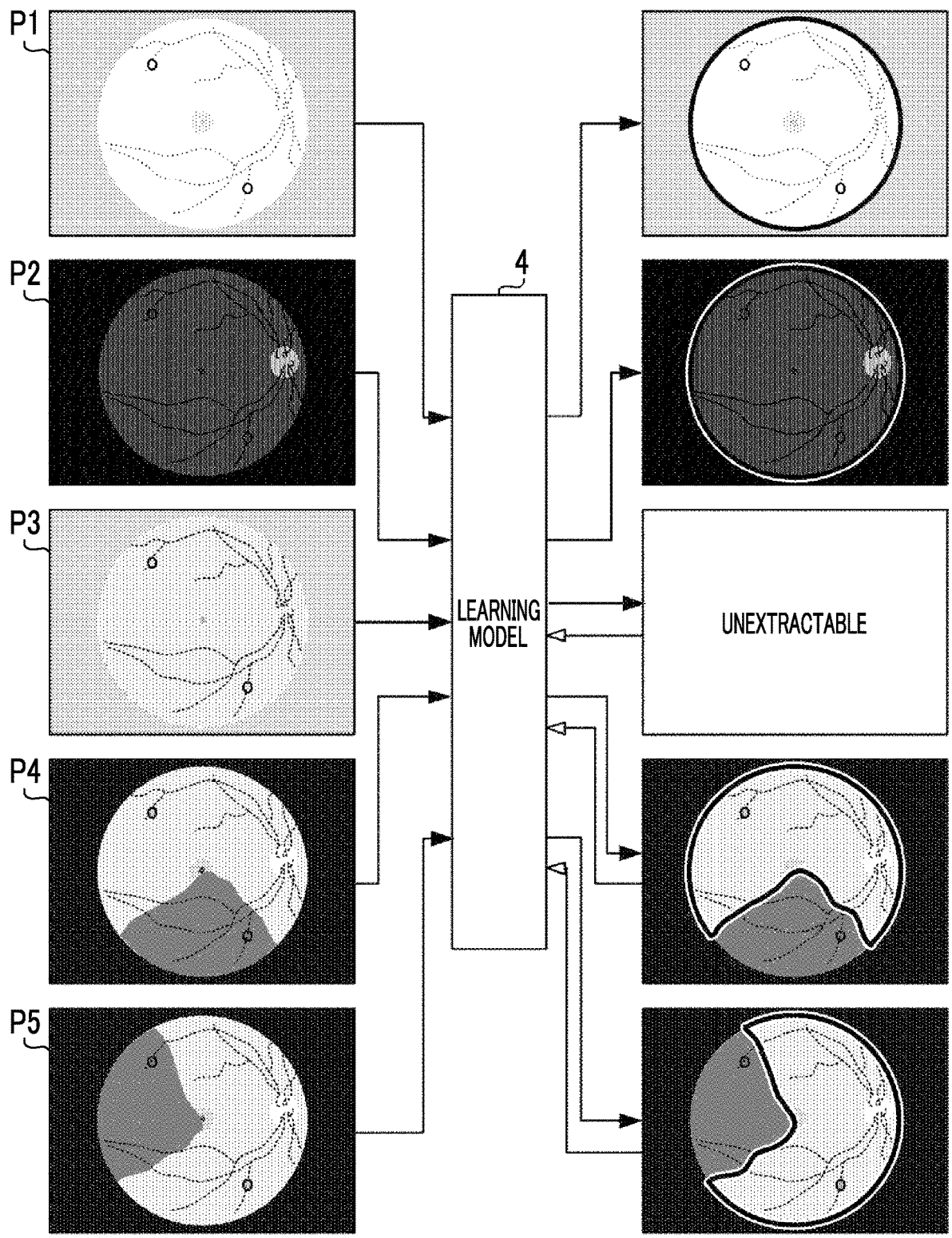
FIG. 16 is a diagram showing an example of a pseudo image that is input to a learning model.

A specific example of the pseudo image will be described with reference to FIG. 16. Plural the pseudo images P1 to P5 shown on the left side of FIG. 16 are pseudo images each of which is generated on the basis of the medical image G0, and are input to the learning model 4 as data for learning. The pseudo images P1 and P2 are images in which the lightness of the medical image G0 is brightened and darkened, respectively. The pseudo image P3 is an image in which the contrast of the medical image G0 is weakened. The pseudo images P4 and P5 each are an image in which a part of the medical image G0 is darkened.

Further, on the right side of FIG. 16, for each of the input pseudo images, the region of interest extracted by the learning model 4 during learning is surrounded by a thick line and shown. For the pseudo images P1 and P2, regions of interest are appropriately extracted. For the pseudo image P3, an error "unextractable" is output. For the pseudo images P4 and P5, a part of the unclear region that should be originally extracted as the region of interest is not extracted as the region of interest.

As shown in FIG. 16, the pseudo image may have pixel values changed for the entire medical image G0, or may have a pixel value changed for a part of the medical image G0. Further, as shown in the pseudo images P4 and P5, it is preferable to use, as data for learning, plural pseudo images generated in a case where a pixel value in each of different regions for one medical image G0 is changed. According to such an aspect, the number of original images can be reduced, so that learning can be performed efficiently.

Further, as shown in the pseudo images P1 to P5, the pseudo image is preferably an image generated in a case where the pixel value is changed so that the image quality is degraded, in at least a part of the medical image G0. Specifically, the phrase "so that the image quality is degraded" means processing of making it difficult to detect the structure included in the medical image G0, and examples thereof include processing of weakening the contrast. This is because it is considered that considering the operational phase of the learning model, in a case where the input medical image is an image of the fundus of the eye, for example, image darkening caused by insufficient light or image brightening caused by ambient light makes the contrast weaker than that of the clear medical image.

Further, as shown in FIG. 16, the pseudo image is preferably an image generated in a case where the pixel value of the region including at least the region of interest in the medical image G0 is changed. This is because it does not matter whether or not the region except for the region of interest is unclear.

Further, the pseudo image is preferably an image generated in a case where the pixel value of at least a part of the medical image G0 is changed while the existence or non-existence of the structure included in the medical image G0 is maintained. This is because the learning model 4 gives priority to accurately extract the region of interest even from an unclear medical image, and gives low priority to correspond to the change in the existence or nonexistence of the structure.

Further, the pseudo image may be an image generated on the basis of the medical image G0 by using an image generation model such as generative adversarial networks (GAN) and a variational autoencoder (VAE).

The CPU 21 causes the learning model 4, to perform learning in a case where the pseudo images P1 to P5 generated as described above are input to the learning model 4, as the data for learning. Further, as shown in the pseudo images P3 to P5 of FIG. 16, in a case where the learning model 4 fails to appropriately extract the region of interest from the input pseudo image, the CPU 21 may cause the learning model 4, to perform re-learning in response to the re-input of the pseudo images as the data for learning. According to such an aspect, the accuracy of the learning model 4 can be improved.

In a case of re-learning, a ground-truth label may be given to the pseudo image. Specifically, the CPU 21 may cause the learning model 4, to perform re-learning in a case where a pair of the pseudo image and information indicating the region of interest included in the pseudo image is input to the learning model 4 as the data for learning. The information indicating the region of interest means information indicating, for example, the position of the region of interest in the pseudo image.

Figure 17:
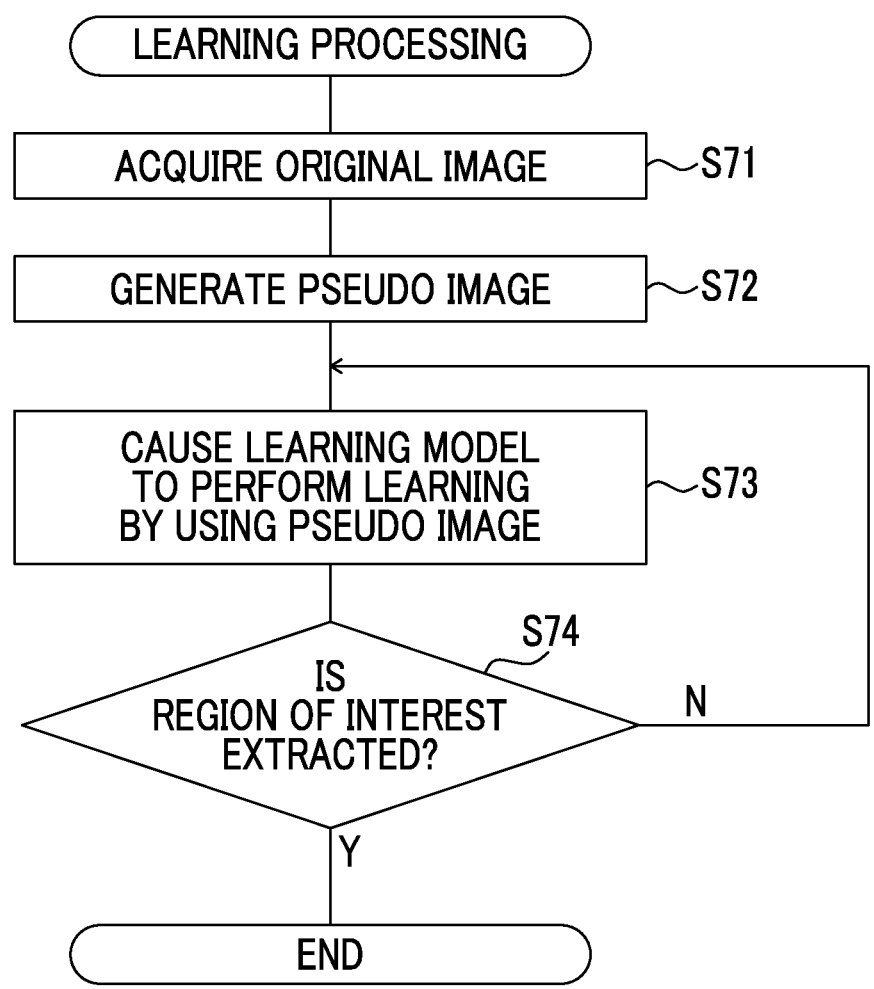
FIG. 17 is a flowchart showing an example of learning processing.

Next, an operation of the information processing apparatus 10 according to the present embodiment will be described with reference to FIG. 17. The CPU 21 executes the information processing program 27, so that learning processing shown in FIG. 17 is executed. The learning processing shown in FIG. 17 is executed, for example, in a case where the user gives an instruction on the start of the processing via the input unit 25.

In Step S71, the CPU 21 acquires the original image obtained by imaging the subject, from the image acquisition apparatus 2. In Step S72, the CPU 21 changes the pixel value of at least a part of the original image acquired in Step S71 to generate a pseudo image. In Step S73, the CPU 21 causes the learning model 4 to perform learning by using the pseudo image generated in Step S72 as data for learning. In Step S74, the CPU 21 determines whether or not the learning model 4 can appropriately extract the region of interest from the input pseudo image.

In a case where the learning model 4 fails to appropriately extract the region of interest from the input pseudo image (that is, negative determination is made in Step S74), the process returns to Step S73, and the CPU 21 causes the learning model 4, to perform re-learning in response to the re-input of the pseudo image to the learning model 4. That is, the re-learning using the same pseudo image is repeated until the learning model 4 can appropriately extract the region of interest from the pseudo image. The learning processing ends at the timing when the learning model 4 appropriately extracts the region of interest from the input pseudo image (that is, the timing when affirmative determination is made in Step S74).

As described above, the information processing apparatus 10 according to the fourth embodiment comprises at least one processor, and the processor causes the learning model that is used to extract a region of interest from an input image, to perform learning in response to an input of the pseudo image generated in a case where the pixel value of at least a part of the original image obtained by imaging the subject is changed, as the data for learning. Therefore, even in a case of an image unsuitable for extraction of a region of interest, a region of interest can be appropriately extracted and the image can be utilized for diagnosis.

In the fourth embodiment, an aspect in which the information processing apparatus 10 causes the learning model 4 that is used by the extraction unit 12 to perform learning by unsupervised learning has been described, but the present disclosure is not limited thereto. The information processing apparatus 10 may cause the learning model 4 to perform learning by supervised learning and semi-supervised learning. Specifically, the CPU 21 may cause the learning model 4, to perform learning in response to the input of a pair of the pseudo image and information indicating a region of interest included in the pseudo image as data for learning. Further, in this case, in a case where the learning model 4 fails to extract the region of interest from the input pseudo image, the CPU 21 causes the learning model 4, to perform re-learning in response to the re-input of the pseudo image as the data for learning.

In the above-described embodiments, description has been made by using the medical image, but the technology of the present disclosure is not applied only to the medical image. The technology of the present disclosure may be applied to an image that is acquired by using, as a subject, a device, a building, a pipe, a welded portion, and the like in a non-destructive inspection such as a radiographic inspection and an ultrasonic inspection.

Further, in each of the above-described embodiments, an aspect in which the information processing system 1 includes the information processing apparatus 10 and the image acquisition apparatus 2 has been described, but the present disclosure is not limited thereto. For example, the information processing system 1 may include one apparatus having both the function of the information processing apparatus 10 and the function of the image acquisition apparatus 2. Alternatively, for example, the information processing system 1 may include plural the image acquisition apparatuses 2, and the information processing apparatus 10 may acquire a medical image from each of the plurality of image acquisition apparatuses 2. Alternatively, for example, the information processing apparatus 10 may consist of plural devices that are different from each other for each function, such as the acquisition unit 11, the extraction unit 12, the determination unit 13, the detection unit 14, the presentation unit 15, and the combination unit 16.

Further, in the above-described embodiment, for example, as a hardware structure of a processing unit that executes various processing such as processing performed by the acquisition unit 11, the extraction unit 12, the determination unit 13, the detection unit 14, the presentation unit 15, and the combination unit 16, the following various processors may be used. The various processors include, for example, a programmable logic device (PLD), such as a field programmable gate array (FPGA), which is a processor having a changeable circuit configuration after manufacture, and a dedicated electrical circuit, such as an application specific integrated circuit (ASIC), which is a processor having a dedicated circuit configuration designed to perform specific processing, in addition to the CPU which is a general-purpose processor that executes software (program) to function as various processing units as described above.

One processing unit may be constituted of one of the various processors or may be constituted of a combination of two or more processors of the same type or different types (for example, a combination of plural FPGAs and a combination of a CPU and an FPGA). Further, the plurality of processing units may constitute one processor.

A first example of the configuration in which the plurality of processing units are constituted of one processor is an aspect in which one or more CPUs and software are combined to constitute one processor and the processor functions as plural processing units. A representative example of the aspect is a computer such as a client and server. A second example of the configuration is an aspect in which a processor that implements all of the functions of a system including the plurality of processing units with one integrated circuit (IC) chip is used. A representative example of the aspect is a system-on-chip (SoC). As described above, as the hardware structure of various processing units, one or more of the various processors are used.

Furthermore, as the hardware structure of the various processors, more specifically, an electrical circuit (circuitry) in which circuit elements, such as semiconductor elements, are combined may be used.

In the present embodiment, an aspect in which the information processing program 27 is stored (installed) in the storage unit 22 in advance has been described, but the present disclosure is not limited thereto. The information processing program 27 may be recorded on a recording medium, such as a compact disc read only memory (CD-ROM), a digital versatile disc read only memory (DVD-ROM), or a universal serial bus (USB) memory, and then provided. Further, the information processing program 27 may be downloaded from an external apparatus via the network. Furthermore, the technique of the present disclosure extends to a storage medium on which the information processing program is non-temporarily stored, in addition to the information processing program.

In the technology of the present disclosure, the above-described exemplary embodiments can be appropriately combined with each other. The contents described and illustrated above are detailed descriptions for the part related to the technology of the present disclosure, and are merely an example of the technology of the present disclosure. For example, the description regarding the above-described configuration, function, operation, and effect is the description regarding an example of the configuration, function, operation, and effect of the part according to the technology of the present disclosure. Accordingly, it goes without saying that an unnecessary part may be deleted, a new element may be added, or replacement may be made with respect to the contents described and illustrated above, within a scope not departing from the gist of the technology of the present disclosure.

What is claimed is:

1. An information processing apparatus comprising:
at least one processor,
wherein the at least one processor is configured to cause a learning model, that is used to extract a region of interest from an input image, to perform learning in response to an input of a pseudo image generated in a case in which a pixel value of at least a part of an original image obtained by imaging a subject is changed, as data for learning, and
wherein the at least one processor is configured to cause the learning model to perform re-learning in response to a re-input of the pseudo image as the data for learning in a case in which the learning model fails to extract a region of interest from the input pseudo image.

2. The information processing apparatus according to claim 1, wherein the at least one processor is configured to cause the learning model to perform learning in response to an input of a pair of the pseudo image and information indicating a region of interest included in the pseudo image, as the data for learning.

3. The information processing apparatus according to claim 1, wherein the at least one processor is configured to cause the learning model to perform re-learning in response to a re-input of a pair of the pseudo image and information indicating the region of interest included in the pseudo image, as the data for learning, in a case where the learning model fails to extract the region of interest from the input pseudo image.

4. The information processing apparatus according to claim 1, wherein the pseudo image is an image generated in a case where a pixel value is changed so that an image quality is degraded, in at least a part in the original image.

5. The information processing apparatus according to claim 1, wherein the pseudo image is an image generated in a case where a pixel value of at least a part of the original image is changed while existence or nonexistence of a structure included in the original image is maintained.

6. The information processing apparatus according to claim 1, wherein the pseudo image is an image generated in a case where a pixel value of a region including at least a region of interest in the original image is changed.

7. The information processing apparatus according to claim 1, wherein the pseudo image is an image generated on the basis of the original image by using generative adversarial networks (GAN).

8. The information processing apparatus according to claim 1, wherein the pixel value is a value indicating at least one of hue, saturation, brightness, or lightness represented by each pixel.

9. The information processing apparatus according to claim 1, wherein the region of interest is a region including at least one of the subject, a part of a tissue included in the subject, or an abnormal part included in the subject or the tissue.

10. The information processing apparatus according to claim 1, wherein the original image is an image obtained by at least one of a radiography apparatus, a magnetic resonance imaging apparatus, an ultrasonic apparatus, a fundus photography apparatus, or an endoscope.

11. An information processing apparatus, comprising:
at least one processor,
wherein the at least one processor is configured to cause a learning model, that is used to extract a region of interest from an input image, to perform learning in response to an input of a pseudo image generated in a case in which a pixel value of at least a part of an original image obtained by imaging a subject is changed, as data for learning, and
wherein the at least one processor is configured to cause the learning model to perform learning in response to an input of a plurality of the pseudo images generated in a case where a pixel value in each of different regions for one original image is changed, as the data for learning.

12. An information processing method executed by a computer, the method comprising:
causing a learning model, that is used to extract a region of interest from an input image, to perform learning in response to an input of a pseudo image generated in a case where a pixel value of at least a part of an original image obtained by imaging a subject is changed, as data for learning; and
causing the learning model to perform re-learning in response to a re-input of the pseudo image as the data for learning in a case where the learning model fails to extract a region of interest from the input pseudo image.

13. The information processing method executed by a computer according to claim 12, the method further comprising:
causing the learning model to perform learning in response to an input of a pair of the pseudo image and information indicating a region of interest included in the pseudo image, as the data for learning.

14. The information processing method executed by a computer according to claim 12, the method further comprising:
causing the learning model to perform re-learning in response to a re-input of a pair of the pseudo image and information indicating the region of interest included in the pseudo image, as the data for learning, in a case where the learning model fails to extract the region of interest from the input pseudo image.

15. A non-transitory computer-readable storage medium storing an information processing program executable by a computer to perform a process comprising:
causing a learning model, that is used to extract a region of interest from an input image, to perform learning in response to an input of a pseudo image generated in a case where a pixel value of at least a part of an original image obtained by imaging a subject is changed, as data for learning; and
causing the learning model to perform re-learning in response to a re-input of the pseudo image as the data for learning in a case where the learning model fails to extract a region of interest from the input pseudo image.

16. The non-transitory computer-readable storage medium according to claim 15, the process further comprising:
causing the learning model to perform learning in response to an input of a pair of the pseudo image and information indicating a region of interest included in the pseudo image, as the data for learning.

17. The non-transitory computer-readable storage medium according to claim 15, the process further comprising:
causing the learning model, to perform re-learning in response to a re-input of a pair of the pseudo image and information indicating the region of interest included in the pseudo image, as the data for learning, in a case where the learning model fails to extract the region of interest from the input pseudo image.

* * * * *